(12) United States Patent
Yasutake et al.

(10) Patent No.: US 7,630,816 B2
(45) Date of Patent: Dec. 8, 2009

(54) MOTION CONTROL APPARATUS FOR VEHICLE

(75) Inventors: Toshio Yasutake, Nagoya (JP); Toshihisa Kato, Handa (JP); Shinji Tsugawa, Obu (JP)

(73) Assignee: Advics Co., Ltd., Kariya, Aich-Pref. (JP)

( * ) Notice: Subject to any disclaimer, the term of this patent is extended or adjusted under 35 U.S.C. 154(b) by 565 days.

(21) Appl. No.: 11/594,921

(22) Filed: Nov. 9, 2006

(65) Prior Publication Data

US 2007/0112498 A1 May 17, 2007

(30) Foreign Application Priority Data

Nov. 14, 2005 (JP) ............................. 2005-328240

(51) Int. Cl.
*B60T 8/58* (2006.01)
*G06F 19/00* (2006.01)
(52) U.S. Cl. .............................. 701/72; 701/38; 701/78; 303/140
(58) Field of Classification Search .................. 701/72, 701/38, 41, 70, 78; 303/146, 140; 280/5.502, 280/5.506, 5.509
See application file for complete search history.

(56) References Cited

U.S. PATENT DOCUMENTS 7,463,965 B2 * 12/2008 Sakata .......................... 701/83
2004/0030479 A1 * 2/2004 Arndt et al. ................... 701/70

FOREIGN PATENT DOCUMENTS

JP 10-081215 A 3/1998

* cited by examiner

*Primary Examiner*—Tan Q Nguyen
(74) *Attorney, Agent, or Firm*—Buchanan Ingersoll & Rooney PC

(57) ABSTRACT

In rollover prevention control, an inner front wheel braking force is generated only in a front wheel located on the radially inner side of a turning locus in a relatively early stage where the absolute value of actual lateral acceleration is between a first value and a second value. When the absolute value becomes greater than the second value, in addition to the inner front wheel braking force, an inner rear wheel braking force is generated in a rear wheel located on the radially inner side of the turning locus. When the absolute value becomes greater than a third value, in addition to the inner rear wheel braking wheel, an outer wheel braking force is generated in the front wheel located on the radially outer side of the turning locus. Thus, an increase in the roll angle is suppressed, and a desired turning locus tracing performance is maintained satisfactorily.

11 Claims, 10 Drawing Sheets

FIG.3
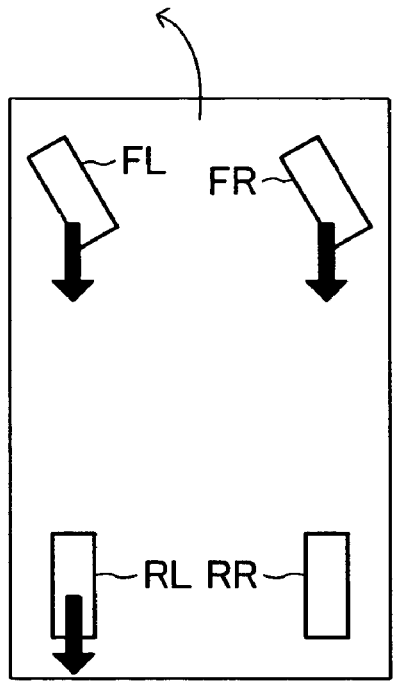
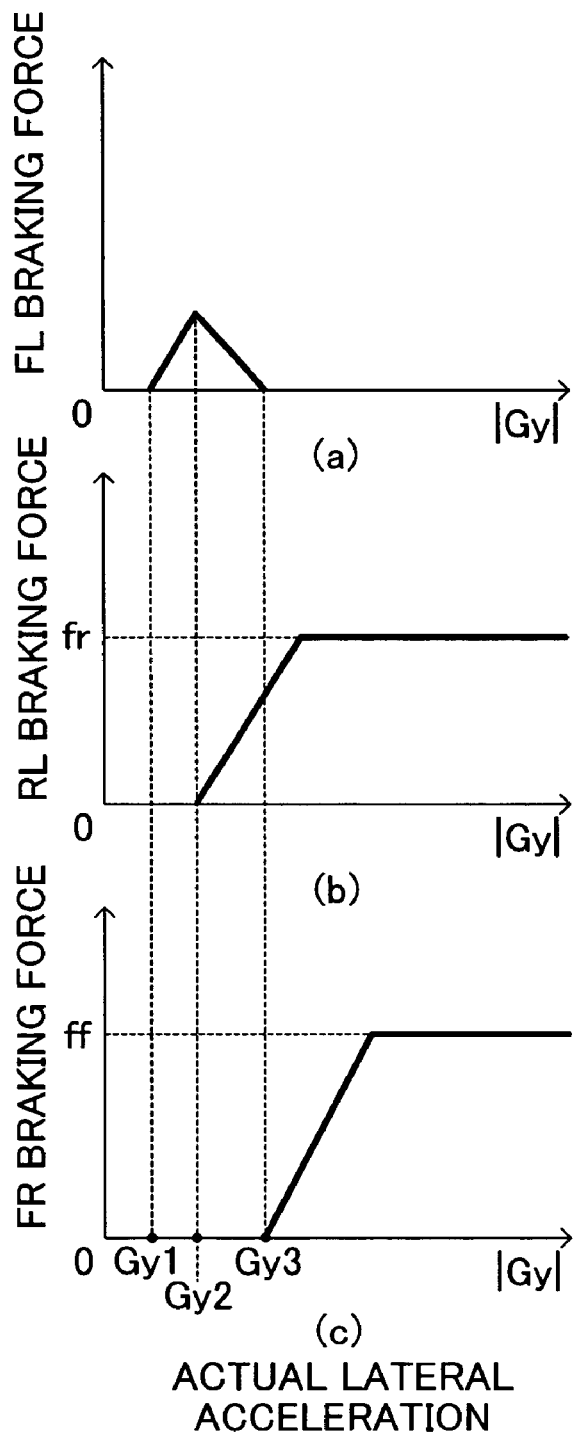
→ : DIRECTION OF BRAKING FORCE
→ : TURNING DIRECTION OF VEHICLE
(a)
(b)
(c)
ACTUAL LATERAL ACCELERATION

MOTION CONTROL APPARATUS FOR VEHICLE

CROSS REFERENCE TO RELATED APPLICATION

This application is based on and claims under 35 U.S.C. sect, 119 with respect to Japanese Patent Application No. 2005-328240 filed on Nov. 14, 2005, the entire content of which is incorporated herein by reference.

BACKGROUND OF THE INVENTION

1. Field of the Invention

The present invention relates to a motion control apparatus for a vehicle which controls the motion of a vehicle by controlling the braking forces applied to the wheels of the vehicle.

2. Description of the Related Art

For example, a motion control apparatus (braking apparatus) for a vehicle disclosed in Japanese Patent Application Laid-Open (kokai) No. H10-81215 applies a braking force (hereinafter referred to "outer wheel braking force") to a wheel (e.g., front wheel) located on the radially outer side of a turning locus when (the absolute value of) an actual lateral acceleration acting on the vehicle becomes equal to or higher than a certain threshold. With this configuration, upon application of the outer wheel braking force, a yawing moment in the direction opposite the turning direction of the vehicle is generated in the vehicle, whereby the magnitude of the actual lateral acceleration acting on the vehicle decreases, and thus, excessive rolling of the vehicle can be prevented.

However, when a yawing moment in the direction opposite the turning direction of the vehicle is generated in the vehicle upon application of the outer wheel braking force, the turning vehicle is controlled to a direction of understeering. As a result, in some cases a desired turning locus tracing performance cannot be maintained satisfactorily.

In order to overcome the above-described drawback, a motion control apparatus for a vehicle disclosed in Japanese Patent Application Laid-Open (kokai) No. 2005-35451 applies a braking force (hereinafter referred to "inner rear wheel braking force") only to a rear wheel located on the radially inner side of a turning locus when (the absolute value of) an actual lateral acceleration acting on the vehicle is equal to or higher than a first threshold but is not greater than a second threshold greater than the first threshold. When the actual lateral acceleration (its absolute value) increases further and reaches the second threshold in spite of application of the inner rear wheel braking force, like the apparatus disclosed in the first mentioned publication, the motion control apparatus applies an outer wheel braking force.

By virtue of this configuration, in a process in which the roll angle increases, first only the inner rear wheel braking force is applied to the relevant wheel. As a result, a yawing moment in the same direction as the turning direction of the vehicle is generated in the vehicle, whereby the desired turning locus tracing performance of the vehicle can be maintained satisfactorily. In addition, on a portion of the vehicle body located above the rear wheel located on the inner side of a turning locus, a force for suppressing an increase in the height of that portion (hereinafter referred to as "vehicle height reducing force" acts, whereby an increase in the roll angle is suppressed. That is, it is possible to prevent excessive rolling of the vehicle, while satisfactorily maintaining the desired turning locus tracing performance.

Here, a mechanism in which the vehicle height reducing force is generated will be described. Such vehicle height reducing force is generated because a suspension which links a wheel and the vehicle body typically has a structure in which an instantaneous center located on the vehicle body side and which becomes effective when the wheel moves in relation to the vehicle body is located above and frontward in relation to the center of the wheel. That is, when a braking force is applied to a certain wheel, a braking force acts on the instantaneous center located on the vehicle body side (accordingly to the vehicle body itself), and a moment around the instantaneous center acts on that wheel. Because of the above-described positional relation between the center of the wheel and the instantaneous center, the moment acts in a direction of reducing the vertical distance between the center of the wheel and the instantaneous center. As a result, a force (that is, vehicle height reducing force) for suppressing an increase in the height of the instantaneous center located on the vehicle body side (accordingly, a portion of the vehicle body located above such a wheel) acts on that portion. In this manner, when a braking force is applied to a certain wheel, a vehicle height reducing force acts on a portion of the vehicle body located above that wheel.

In general, when a vehicle is in a deceleration state, the load imposed on the front wheels increases due to an inertial force acting on the vehicle. Accordingly, when a vehicle is in a deceleration state, a yawing moment is effectively generated in the vehicle upon application of a braking force to a front wheel, as compared to the case where a braking force is applied to a rear wheel. In addition, when a braking force is applied to the driven wheel located on the radially inner side of a turning locus, due to the action of a differential in a driven state, a proportion of the drive force distributed to the driven wheel located on the radially outer side of the turning locus increases, so that a yawing moment of the same direction as the turning direction can be generated effectively. In view of the above, the desired turning locus tracing performance is expected to be maintained more satisfactorily, if, instead of the inner rear wheel braking force, a force (hereinafter referred to as "inner front wheel braking force") is first applied only to a front wheel located on the radially inner side of the turning locus. That is, the apparatus disclosed in the second mentioned publication has room for improvement in terms of properly maintaining the desired turning locus tracing performance.

DISCLOSURE OF THE INVENTION

The present invention has been accomplished in order to solve the above-described problem, and an object of the present invention is to provide a motion control apparatus for a vehicle which can prevent the vehicle from rolling excessively, while more satisfactorily maintaining a desired turning locus tracing performance.

A motion control apparatus for a vehicle according to the present invention comprises determination means (turning state determination means) for determining whether or not the vehicle is in a turning state; obtaining means (index obtaining means) for obtaining an index value (an excessive rolling generation tendency index) indicating the degree of a tendency of the vehicle to roll excessively; and first control means (inner-front-wheel-braking-force control means) for applying a first braking force (that is, the above-described inner front wheel braking force) only to a front wheel at an inner side of a turning direction (located on the radially inner side of a turning locus) when the vehicle is in a turning state and the index value is equal to or greater than a predetermined first value (the degree of the tendency of excessive rolling, which is indicated by the excessive rolling generation tendency index, becomes equal to or greater than a predetermined first degree).

The excessive rolling generation tendency index is, but is not limited thereto, a value based on at least one of lateral acceleration (a component, in the lateral direction of the vehicle body, of acceleration acting on the vehicle); yaw rate acting on the vehicle; roll angle of the vehicle; roll angle speed, which is the rate of change of the roll angle with time; operation amount of a steering wheel which changes the steering angle of steerable wheels of the vehicle; and operation speed of the steering wheel (e.g., a value determined on the basis of any one of these values, or a value determined on the basis of two or more of these values).

By virtue of the above-described configuration, when the degree of the tendency of the vehicle rolling excessively becomes equal to or greater than the predetermined first degree, the inner front wheel braking force is applied only to a front wheel located on the radially inner side of a turning locus. This inner front wheel braking force serves as the above-described vehicle height reducing force which suppresses an increase in the height of a portion of the vehicle body located above the front wheel located on the radially inner side of the turning locus. Accordingly, an increase in the roll angle of the vehicle can be suppressed, whereby the vehicle is prevented from rolling excessively.

In addition, upon application of this inner front wheel braking force, a yawing moment is generated in the vehicle in the same direction as the turning direction, whereby the desired turning locus tracing performance can be maintained satisfactorily. In particular, the inner front wheel braking force acts on the front wheel whose load increases in a deceleration state. Accordingly, upon application of the inner front wheel braking force, a yawing moment of the same direction as the turning direction can be generated more effectively, as compared to the case of the apparatus described in the second mentioned publication in which the above-mentioned inner rear wheel braking force is applied to a relevant rear wheel. As a result, the desired turning locus tracing performance can be maintained more satisfactorily, as compared to the apparatus described in the second mentioned publication.

Preferably, the inner-front-wheel-braking-force control means is configured to change the inner front wheel braking force in accordance with the degree of the tendency of excessive rolling, which is indicated by the excessive rolling generation tendency index. This configuration enables the inner front wheel braking force to be increased with the degree of the tendency of excessive rolling. Accordingly, the inner front wheel braking force can be set to a proper (just enough) level in accordance with the degree to which occurrence of excessive rolling is to be prevented.

In addition, preferably, the motion control apparatus of the present invention is applied to a vehicle whose front wheels are driven wheels. When the motion control apparatus of the present invention is applied to a vehicle having four wheels, the vehicle is preferably a front-wheel drive vehicle or a four-wheel drive vehicle.

In general, left and right wheels are connected together via a differential. When the left and right wheels are driven wheels, a drive force from a drive source is properly distributed to the left and right wheels by the action of the differential. If a drive force is transmitted from the drive source to the differential with a braking force applied only to one of the left and right wheels, the proportion of the drive force distributed to the other wheel to which no braking force is applied increases because of the action of the differential.

Therefore, in the case where the front wheels are driven wheels, if a drive force is transmitted from the drive source to the front-wheel-side differential with a braking force applied only to the front wheel located on the radially inner side of a turning locus, the proportion of the drive force distributed to the front wheel located on the radially outer side of the turning locus increases because of the action of the front-wheel-side differential. This means that the yawing moment generated in the vehicle in the same direction as the turning direction increases. Accordingly, when the inner front wheel braking force is applied in the case where the front wheels are driven wheels as in the above-described configuration, due to the action of the differential, a yawing moment of the same direction as the turning direction can be generated more effectively in a driven state (state in which a drive force is transmitted from the drive source to the driven wheels). As a result, the desired turning locus tracing performance can be maintained more satisfactorily.

Preferably, the motion control apparatus of the present invention further comprises second control means (inner-rear-wheel braking force control means) for applying a second braking force (that is, the above-described inner rear wheel braking force) to a rear wheel located on the radially inner side of a turning locus when the vehicle is in a turning state and the index value is equal to or greater than a predetermined second value greater than the predetermined first value (the degree of the tendency of excessive rolling, which is indicated by the excessive rolling generation tendency index, becomes equal to or greater than a predetermined second degree greater than the predetermined first degree).

In general, when the vehicle rolls excessively, in many cases, the height of the vehicle body becomes minimum at a front portion of the vehicle body located on the radially outer side of a turning locus, and maximum at a rear portion of the vehicle body located on the radially inner side of the turning locus. The above-described configuration is based on this understanding. That is, in the case where the degree of the tendency of excessive rolling increases even after application of the above-described inner front wheel braking force, the above-mentioned inner rear wheel braking force is applied (in addition to the inner front wheel braking force) so as to suppress an increase in the height of the rear portion of the vehicle body located on the radially inner side of the turning locus, whereby occurrence of excessive rolling of the vehicle is prevented more effectively. Further, since a yawing moment of the same direction as the turning direction is generated in the vehicle, the desired turning locus tracing performance can be maintained more satisfactorily.

In this case, preferably, the inner-rear-wheel-braking-force control means is configured to change the inner rear wheel braking force in accordance with the degree of the tendency of excessive rolling, which is indicated by the excessive rolling generation tendency index. This configuration enables the inner rear wheel braking force to be increased with the degree of the tendency of excessive rolling. Accordingly, the inner rear wheel braking force can be set to a proper (just enough) level in accordance with the degree to which occurrence of excessive rolling is to be prevented.

Preferably, the motion control apparatus of the present invention which comprises the inner-rear-wheel-braking-force control means as described above further comprises third control means (outer-wheel braking force control means) for applying a braking third force (that is, the above-described outer wheel braking force) to at least one of wheels at an outer side of a turning direction (located on the radially outer side of a turning locus) when the vehicle is in a turning state and the index value is equal to or greater than a predetermined third value greater than the predetermined first value (the degree of the tendency of excessive rolling, which is indicated by the excessive rolling generation tendency index, becomes equal to or greater than a predetermined third degree greater than the predetermined first degree). The degree of the tendency of excessive rolling corresponding to the predetermined third degree may be set to be equal to the degree of the tendency of excessive rolling corresponding to the predetermined second degree.

As described above, when the inner front wheel braking force or the inner rear wheel braking force is applied, an increase in the roll angle can be prevented by means of the above-described vehicle height reducing force. However, application of the inner front wheel braking force or the inner rear wheel braking force results in generation of a yawing moment in the vehicle in the same direction as the turning direction and an increase in the centrifugal force acting on the vehicle. Accordingly, sole application of the inner front wheel braking force or the inner rear wheel braking force may result in an increase in the roll angle of the vehicle body because of, in particular, a decrease in the height of the vehicle body on the radially outer side of a turning locus.

In contrast, when the motion control apparatus is configured to apply the outer wheel braking force when the degree of the tendency of excessive rolling becomes equal to or greater than the predetermined third degree as described above, a yawing moment can be generated in the direction opposite the turning direction so as to cancel (at least partially) the yawing moment of the same direction as the turning direction generated upon application of the inner front wheel braking force or the inner rear wheel braking force. As a result, an increase in the roll angle of the vehicle, which is caused by, in particular, a decrease in the height of the vehicle body on the radially outer side of a turning locus, is suppressed, and generation of excessive rolling can be prevented more effectively.

In this case, preferably, the degree of the tendency of excessive rolling corresponding to the predetermined third degree is set to be greater than the degree of the tendency of excessive rolling corresponding to the predetermined second degree. By virtue of this configuration, in a process in which the degree of the tendency of excessive rolling increases, the application of the outer wheel braking force is started after the application of the inner rear wheel braking force is started. Accordingly, the application of the outer wheel braking force is started in a state in which an increase in the height of a rear portion of the vehicle body located on the radially inner side of a turning locus is suppressed reliably, whereby generation of excessive rolling can be prevented more reliably.

Preferably, the outer-wheel braking force control means is configured to apply the outer wheel braking force to a front wheel located on the radially outer side of a turning locus, wherein the front wheel serves as "at least one of wheels located on the radially outer side of a turning locus." When the vehicle is in a deceleration state, the load imposed on the front wheels increase due to the force of inertia acting on the vehicle. Therefore, if a braking force is applied to the front wheels, that braking force effectively functions as a deceleration force for decelerating the vehicle. Accordingly, when the motion control apparatus is configured to apply the outer wheel braking force to the front wheel located on the radially outer side of a turning locus as described above, the action of the yawing moment of the direction opposite the turning direction of the vehicle and the action of the deceleration force cooperatively reduce the actual lateral acceleration acting on the vehicle further. As a result, generation of excessive rolling in the vehicle can be prevented more effectively.

Preferably, the outer-wheel-braking-force control means is configured to change the outer wheel braking force in accordance with the degree of the tendency of excessive rolling, which is indicated by the excessive rolling generation tendency index. This configuration enables the outer wheel braking force to be increased with the degree of the tendency of excessive rolling. Accordingly, the outer wheel braking force can be set to a proper (just enough) level in accordance with the degree to which occurrence of excessive rolling is to be prevented.

Preferably, the first control means (the inner-front-wheel-braking-force control means) is configured to set the first braking force (the inner front wheel braking force) so that the first braking force decreases as the index value increases when the index value lies in the range between the second value and the third value. By virtue of this configuration, the yawing moment of the same direction as the turning direction generated upon application of the inner front wheel braking force is decreased. As a result, generation of excessive rolling can be prevented more effectively.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 3 is a diagram showing an example braking force applied to each wheel of the vehicle in the case where a rollover prevention control is performed while the vehicle is turning in the counterclockwise direction (as seen from the top of the vehicle);

DESCRIPTION OF THE PREFERRED EMBODIMENT

Figure 1:
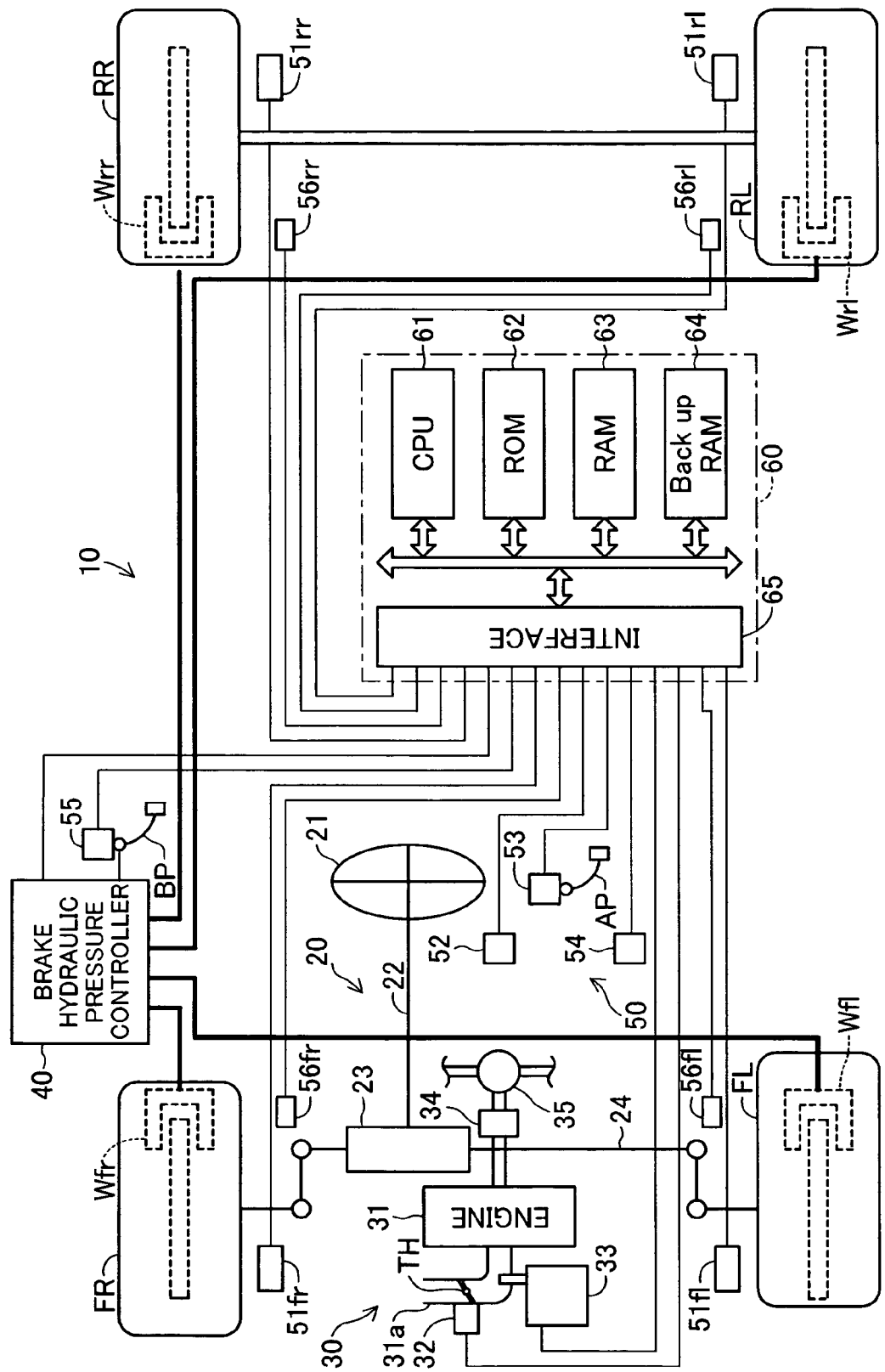
FIG. 1 is a schematic diagram of a vehicle equipped with a motion control apparatus for a vehicle according to an embodiment of the present invention.

An embodiment of a motion control apparatus for a vehicle according to the present invention will be described below while referring to the drawings. FIG. 1 schematically illustrates a vehicle on which a vehicle motion control apparatus 10 according to the embodiment of the present invention is mounted. The illustrated vehicle is a front-wheel drive vehicle having two front wheels (a front left wheel FL and a front right wheel FR) which are steerable, driven wheels, and two rear wheels (a rear left wheel RL and a rear right wheel RR) which are nonsteerable, nondriven wheels (follower wheels).

This vehicle motion control apparatus 10 has a front-wheel steering mechanism portion 20 for steering the steerable wheels FL and FR; a drive force transmission mechanism portion 30 which generates a drive force and transmits it to the driven wheels FL and FR; a brake hydraulic pressure controller 40 for generating a braking force in each wheel by brake hydraulic pressure; a sensor portion 50 comprising various sensors; and an electronic controller 60.

The front-wheel steering mechanism 20 comprises a steering wheel 21, a steering column 22 which is rotatable together with the steering wheel 21, a steering actuator 23 which is linked to the steering column 22, and a link mechanism 24 which includes a tie rod moved to the left and right of the vehicle body by the steering actuator 23 and which can turn the steerable wheels FL and FR by the movement of the tie rod.

The drive force transmission mechanism portion 30 comprises an engine 31 which generates a drive force, a throttle valve actuator 32 comprising a DC motor which controls the opening of a throttle valve TH which is disposed in the intake pipe 31a of the engine 31 and which varies the open cross-sectional area of the intake pipe 31a, a fuel injection apparatus 33 which includes unillustrated fuel injectors which spray fuel in the vicinity of unillustrated intake ports of the engine 31, a transmission 34 which is connected to an output shaft of the engine 31, and a differential gear 35 which distributes the drive force which is transmitted from the transmission 34 between the two front wheels FR and FL.

Figure 2:
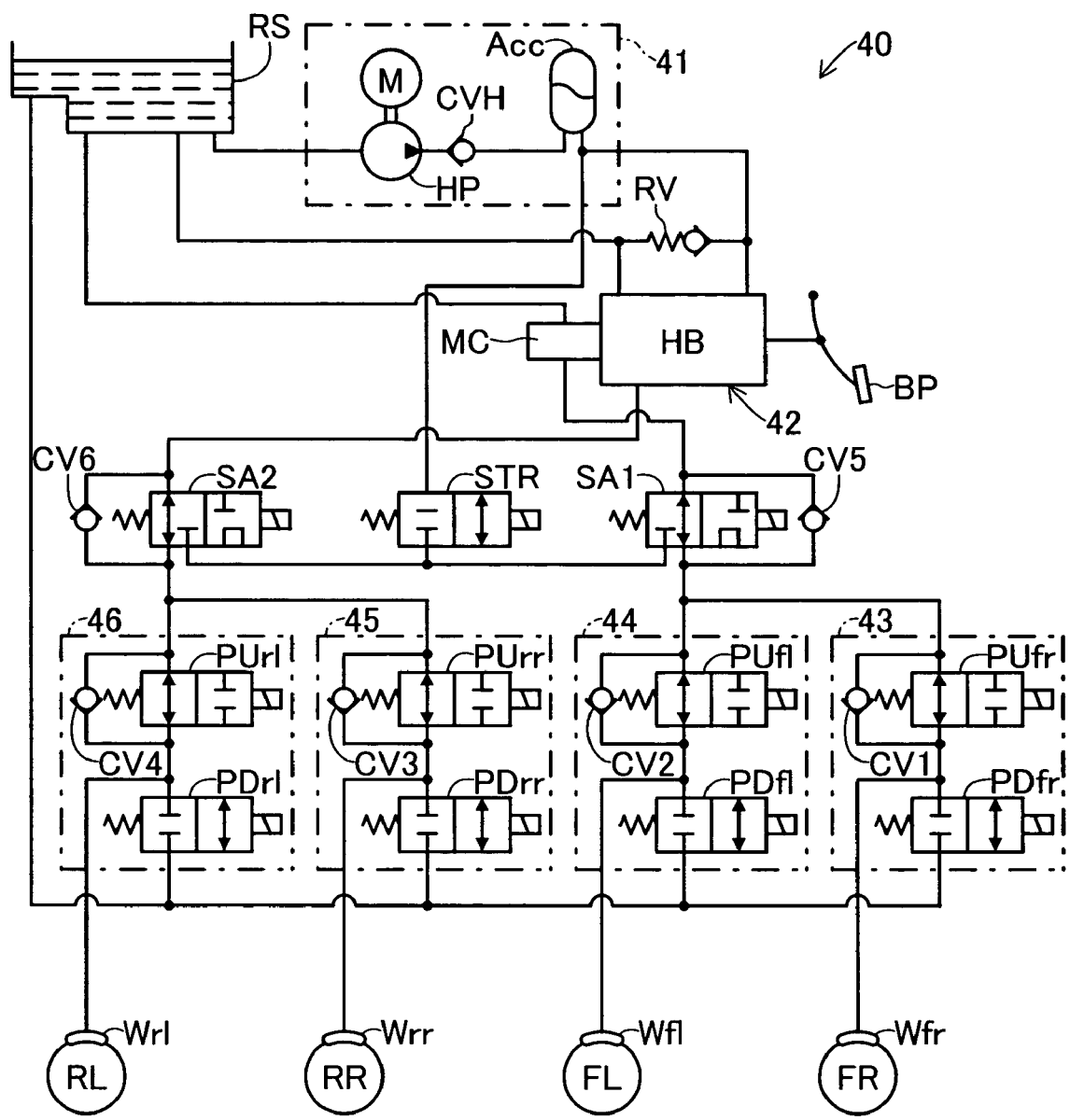
FIG. 2 is a schematic diagram of the brake hydraulic pressure controller shown in FIG. 1.

As schematically shown in FIG. 2, the brake hydraulic pressure controller 40 includes a high pressure generating portion 41, a brake hydraulic pressure generating portion 42 which generates brake hydraulic pressure in response to the operating force of a brake pedal BP, a brake hydraulic pressure adjuster 43 for the front right wheel FR, a brake hydraulic pressure adjuster 44 for the front left wheel FL, a brake hydraulic pressure adjuster 45 for the rear right wheel RR, and a brake hydraulic pressure adjuster 46 for the rear left wheel RL. The brake hydraulic pressure adjuster 43, the brake hydraulic pressure adjuster 44, the brake hydraulic pressure adjuster 45, and the brake hydraulic pressure adjuster 46 can adjust the brake hydraulic pressures supplied to the corresponding wheel cylinders Wfr, Wfl, Wrr, and Wrl which are respectively installed on wheels FR, FL, RR, and RL.

The high pressure generating portion 41 includes an electric motor M, a hydraulic pump HP which is driven by the electric motor M and increases the pressure of brake fluid from a reservoir RS, and an accumulator Acc which is connected to the discharge side of the hydraulic pump HP through a check valve CVH and which stores brake fluid which is increased in pressure by the hydraulic pump HP.

The brake hydraulic pressure generating portion 42 includes a hydraulic booster HB which operates in response to the operation of the brake pedal BP, and a master cylinder MC which is linked to the hydraulic booster HB. The hydraulic booster HB utilizes the high pressure which is supplied from the hydraulic pressure high pressure generating portion 41 to assist the operating force of the brake pedal BP by a prescribed ratio and transmits the assisted operating force to the master cylinder MC.

A control valve SA1, which is a 3-port, 2-position solenoid valve, is disposed between the master cylinder MC and the upstream side of the brake hydraulic pressure adjuster 43 for the front right wheel FR and the upstream side of the brake hydraulic pressure hydraulic pressure adjuster 44 for the front left wheel FL. Similarly, a control valve SA2, which is also a 3-port, 2-position solenoid valve, is disposed between the hydraulic booster HB and the upstream side of the brake hydraulic pressure adjuster 45 for the rear right wheel RR and the upstream side of the brake hydraulic pressure hydraulic pressure adjuster 46 for the rear left wheel RL. A switching valve STR, which is a 2-port, 2-position, normally closed solenoid valve, is disposed between the high pressure generating portion 41 and the control valves SA1 and SA2.

With this structure, when the control valve SA1 is in its first position (a position in a nonenergized state), the master cylinder hydraulic pressure is supplied to the upstream side of the brake hydraulic pressure adjuster 43 for the front right wheel FR and the upstream side of the brake hydraulic pressure adjuster 44 for the front left wheel FL, and when the control valve SA1 is in its second position (a position in an energized state) and the switching valve STR is in its second position (the position corresponding to an energized state), the high pressure generated in the high pressure generating portion 41 is supplied to the upstream side of the brake hydraulic pressure adjuster 43 and the upstream side of the brake hydraulic pressure adjuster 44.

Similarly, when the control valve SA2 is in its first position, the regulator hydraulic pressure from the hydraulic booster HB is supplied to the upstream side of the brake hydraulic pressure adjuster 45 for the rear right wheel RR and the upstream side of the brake hydraulic pressure adjuster 46 for the rear left wheel RL, and when the control valve SA2 is in its second position and the switching valve STR is in its second position, the high pressure generated in the high pressure generating portion 41 is supplied to the upstream side of the brake hydraulic pressure adjuster 45 and the upstream side of the brake hydraulic pressure adjuster 46.

The brake hydraulic pressure adjuster 43 for the front right wheel FR comprises a pressure increasing valve PUfr, which is a 2-port, 2-position, normally open solenoid valve, and a pressure reducing valve PDfr, which is a 2-port, 2-position, normally closed solenoid valve.

With this structure, when the pressure increasing valve PUfr and the pressure reducing valve PDfr are each in their first position, the brake hydraulic pressure inside the wheel cylinder Wfr is increased by the supply of the hydraulic pressure on the upstream side of the brake hydraulic pressure adjuster 43 for the front right wheel FR to the inside of the wheel cylinder Wfr. When the pressure increasing valve PUfr is in its second position and the pressure reducing valve PDfr is in its first position, regardless of the hydraulic pressure in the upstream side of the brake hydraulic pressure adjuster 43 for the front right wheel FR, the hydraulic pressure in the wheel cylinder Wfr at that time is maintained. In addition, when the pressure increasing valve PUfr and the pressure reducing valve PDfr are each in their second position, the pressure in the wheel cylinder Wfr is decreased by the return of brake fluid from within the wheel cylinder Wfr to the reservoir RS.

Similarly, the brake hydraulic pressure adjuster 44 for the front left wheel FL, the brake hydraulic pressure adjuster 45 for the rear right wheel RR, and the brake hydraulic pressure adjuster 46 for the rear left wheel RL respectively comprise a pressure increasing valve PUfl and a pressure reducing valve PDfl, a pressure increasing valve PUrr and a pressure reducing valve PDrr, and a pressure increasing valve PUrl and a pressure reducing valve PDrl.

With the structure described above, when all the solenoid valves are in their first position, the brake hydraulic pressure controller 40 supplies brake hydraulic pressure corresponding to the operating force of the brake pedal BP to each wheel cylinder. In this state, by, for example, controlling the pressure increasing valve PUrr and the pressure reducing valve PDrr, the brake hydraulic pressure in just the wheel cylinder Wrr can be decreased by just a prescribed amount.

When the brake pedal BP is not being operated, i.e., when it is in a released state, by utilizing the high pressure generated by the high pressure generating portion 41, the brake hydraulic pressure controller 40 can increase the brake hydraulic pressure in only the wheel cylinder Wfr by a prescribed amount, while maintaining the brake hydraulic pressure in the wheel cylinder Wfl by, for example, switching each of the control valve SA1, the switching valve STR, and the pressure increasing valve PUfl to its second position and controlling the pressure increasing valve PUfr and the pressure reducing valve PDfr.

Referring again to FIG. 1, the sensor portion 50 comprises electromagnetic pick-up-type wheel speed sensors 51fr, 51fl, 51rr, and 51rl which each output a signal having a frequency corresponding to the rotational speed of the corresponding wheel FR, FL, RR, or RL; a steering angle sensor 52 which senses the rotational angle of the steering wheel 21 from a neutral position and outputs a signal indicating the steering angle θs (degrees); an accelerator operation sensor 53 which senses the amount of operation of the accelerator pedal AP operated by the driver and outputs a signal which indicates the amount of operation Accp of the accelerator pedal AP; a lateral acceleration sensor 54 (serving as the index obtaining means) which senses the actual lateral acceleration, as an excessive rolling generation tendency index, which is a component of actual acceleration acting on the vehicle as measured along the lateral direction of the vehicle body and outputs a signal indicating the actual lateral acceleration Gy (m/s$^2$); a brake switch 55 which senses whether the brake pedal BP is being operated by the driver and outputs a signal indicating whether brake operation is taking place; and vehicle height sensors 56fr, 56fl, 56rr, and 56rl which sense the respective heights (from road surface) of predetermined portions (wheel portions) of the vehicle body in the vicinity of the wheels FR, FL, RR, and RL and output signals indicating the vehicle heights Hfr, Ffl, Hrr, and Hrl of the wheel potions.

The steering angle θs is zero when the steering wheel 21 is in its neutral position, it becomes a positive value when the steering wheel 21 is rotated in the counterclockwise direction (as seen by the driver) from the neutral position, and it becomes a negative value when the steering wheel 21 is rotated in the clockwise direction from the neutral position. Further, the actual lateral acceleration Gy becomes positive when the vehicle is turning in the counterclockwise direction (as seen from the top of the vehicle), and becomes negative when the vehicle is turning in the clockwise direction (as seen from the top of the vehicle).

The electronic controller 60 is a microcomputer including a CPU 61; ROM 62 in which are previously stored routines (programs) which are executed by the CPU 61 tables (look-up tables and maps), constants, and the like; RAM 63 in which the CPU 61 temporarily stores data as necessary; backup RAM 64 which store data when the power supply is on and which maintains the stored data when the power supply is cut off; an interface 65 containing A/D converters; and the like. The above components are interconnected by a bus. The interface 65 is connected to the above sensors 51-56 and supplies signals from the sensors 51-56 to the CPU 61, and it outputs drive signals to each of the solenoid valves and the motor M of the brake hydraulic pressure controller 40, the throttle valve actuator 32, and the fuel injection apparatus 33 in accordance with instructions from the CPU 61.

Outline of Vehicle Motion Control according to the Present Invention

The vehicle motion control apparatus 10 according to the present invention calculates a target lateral acceleration Gyt (m/s$^2$) using the following Equation (1), which is a theoretical equation derived from a model of vehicle motion. The target lateral acceleration Gyt is set to become positive when the steering angle θs is a positive value, and to become negative when the steering angle θs is a negative value. This theoretical equation represents a theoretical value of the lateral acceleration acting on the vehicle when the vehicle is turning in a state in which the steering angle and the vehicle-body speed are both constant (during steady circular turning).

$$Gyt=(Vso^2 \theta s)/(n \cdot L) \cdot (1/(1+Kh \cdot Vso^2)) \tag{1}$$

In the above Equation (1), Vso is an estimated vehicle-body speed (m/s), which is calculated as described below n is a gear ratio (constant value), which is a ratio of a change in the rotation angle of the steering wheel 21 to a change in the steering angle of the steerable wheels FL and FR. L is the wheel base (m) of the vehicle, which is a fixed value determined by the vehicle body. Kh is a stability factor (s$^2$/m$^2$), which is a fixed value determined by the vehicle body.

The present apparatus calculates, in accordance with the following Equation (2), a lateral acceleration deviation ΔGy (m/s$^2$), which is a deviation or difference between the absolute value of the target lateral acceleration Gyt calculated as described above and the absolute value of the actual lateral acceleration Gy detected by means of the lateral acceleration sensor 54.

$$\Delta Gy = |Gyt| - |Gy| \tag{2}$$

<Understeering Suppression Control>

When the value of the lateral acceleration deviation ΔGy is positive, the vehicle is in a state in which the actual turning radius is larger than a turning radius determined under the assumption that the target lateral acceleration Gyt is generated in the vehicle (hereinafter referred to as an "understeering state"). Therefore, when the lateral acceleration deviation ΔGy is equal to or higher than a prescribed positive value ΔGy1, the present apparatus determines that the vehicle is in an understeering state and performs understeering suppression control (hereinafter may be referred to as the "US suppression control") for suppressing the understeering state.

Specifically, the present apparatus generates a prescribed braking force corresponding to the value of the lateral acceleration deviation ΔGy only in the rear wheel located on the radially inner side of a turning locus and forcibly generates a yawing moment in the vehicle in the same direction as the turning direction. Due to the yawing moment, the absolute value of the actual lateral acceleration Gy increases, and the actual lateral acceleration Gy is controlled so as to approach the target lateral acceleration Gyt.

<Oversteering Suppression Control>

In contrast, when the value of the lateral acceleration deviation ΔGy is negative, the vehicle is in a state in which the actual turning radius is smaller than a turning radius determined under the assumption that the target lateral acceleration Gyt is generated in the vehicle (hereinafter referred to as an "oversteering state"). Therefore, when the lateral acceleration deviation ΔGy is equal to or smaller than a prescribed negative value (−ΔGy1), the present apparatus determines that the vehicle is in an oversteering state and performs oversteering suppression control (hereinafter may be referred to as "OS suppression control") for suppressing the oversteering state.

Specifically, the present apparatus generates a prescribed braking force corresponding to the value of the lateral acceleration deviation ΔGy only in the front wheel located on the radially outer side of the turning locus and forcibly generates a yawing moment in the vehicle in the direction opposite the turning direction of the vehicle. Due to the yawing moment, the absolute value of the actual lateral acceleration Gy decreases, and the actual lateral acceleration Gy is controlled so as to approach the target lateral acceleration Gyt.

In this manner, by performing understeering suppression control or oversteering suppression control, the present apparatus generates a yawing moment in the vehicle in the direction such that the actual lateral acceleration Gy approaches the target lateral acceleration Gyt, which is calculated in accordance with the above-described Equation (1).

<Rollover Prevention Control>

When the absolute value |Gy| of the actual lateral acceleration Gy detected by means of the lateral acceleration sensor 54 (the tendency or likelihood of the vehicle excessively rolling) is equal to or higher than a rollover prevention control starting reference value Gyth (in the present embodiment, the value equal to a first reference value Gy1 which will be described later), the present apparatus determines that the vehicle tends to roll excessively, and performs rollover prevention control for suppressing (decreasing) an increase in the roll angle in accordance with the absolute value |Gy| of the actual lateral acceleration. Notably, when rollover prevention control is performed (i.e., the absolute value |Gy| of the actual lateral acceleration Gy is equal to or higher than the rollover prevention control starting reference value Gyth), the above-described understeering suppression control and oversteering suppression control are not performed. In other words, the rollover prevention control is executed with higher priority over the understeering suppression control and the oversteering suppression control.

The rollover prevention control will be described in more detail below with reference to FIG. 3. FIG. 3 is a diagram showing an example brake force applied to a wheel in the case where the rollover prevention control is performed when the vehicle is turning in the counterclockwise direction (as seen from the top of the vehicle).

As shown in FIG. 3, when the absolute value |Gy| of the actual lateral acceleration is equal to or higher than the rollover prevention control starting reference value Gyth (=the first reference value Gy1), the present apparatus first causes a braking force (inner front wheel braking force) corresponding to the absolute value |Gy| of the actual lateral acceleration to be generated only in the front wheel (front left wheel FL in FIG. 3) located on the radially inner side of the turning locus as shown in FIG. 3(a). The first reference value Gy1 corresponds to the predetermined first degree.

The inner front wheel braking force is set so as to increase from zero to a certain value with a predetermined slope, as the absolute value |Gy| of the actual lateral acceleration increases, when the absolute value |Gy| of the actual lateral acceleration lies in the range between the first reference value Gy1 and a second reference value Gy2 greater than the first reference value Gy1, and to decrease from the certain value to zero with a predetermined slope, as the absolute value |Gy| of the actual lateral acceleration increases, when the absolute value |Gy| of the actual lateral acceleration lies in the range between the second reference value Gy2 and a third reference value Gy3 greater than the second reference value Gy2. The second reference value Gy2 corresponds to the predetermined second degree, and the third reference value Gy3 corresponds to the predetermined third degree.

As a result of application of the inner front wheel braking force, the above-described vehicle height reducing force is generated at a front portion of the vehicle body located on the radially inner side of the turning locus. Thus, the height of the front portion of the vehicle body located on the radially inner side of the turning locus is prevented from increasing, whereby an increase in the roll angle of the vehicle body is suppressed. In addition, since the inner front wheel braking force is applied to the front wheel whose load increases in a deceleration state, upon application of the inner front wheel braking force, a yawing moment is effectively generated in the vehicle in the same direction as the turning direction of the vehicle. Thus, the desired turning locus tracing performance of the vehicle can be maintained satisfactorily.

Moreover, this vehicle is of a front-wheel drive type. Therefore, when a drive force from the engine 31 is transmitted to the differential gear 35 (see FIG. 1) with the inner front wheel braking force applied, the differential gear 35 distributes the drive force in a larger proportion to the front wheel (the front right wheel FR in FIG. 3) located on the radially outer side of the turning locus. This means that a yawing moment generated in the vehicle in the same direction as the turning direction of the vehicle is increased. Therefore, when the inner front wheel braking force is applied in the drive state, due to the action of the differential gear 35, the yawing moment in the same direction as the turning direction of the vehicle can be generated more effectively. As a result, the desired turning locus tracing performance of the vehicle can be maintained more satisfactorily.

As described above, the above-described inner front wheel braking force is applied as a result of the absolute value |Gy| of the actual lateral acceleration becoming equal to or higher than the first reference value Gy1. However, when the absolute value |Gy| of the actual lateral acceleration still reaches the second reference value Gy2, the present apparatus generates a braking force (inner rear wheel braking force) corresponding to the absolute value |Gy| of the actual lateral acceleration in the rear wheel (the rear left wheel RL of FIG. 3) located on the radially inner side of the turning locus, as shown in FIG. 3(b).

The inner rear wheel braking force is set so as to increase from zero to an upper limit fr with a predetermined slope, as the absolute value |Gy| of the actual lateral acceleration increases from the second reference value Gy2, and to remain at the upper limit fr even when the absolute value |Gy| of the actual lateral acceleration increases further. As a result of application of the inner rear wheel braking force, the above-described vehicle height reducing force is generated at a rear portion of the vehicle body located on the radially inner side of the turning locus. As a result, the height of the rear portion of the vehicle body located on the radially inner side of the turning locus decreases, whereby an increase in the roll angle of the vehicle body is suppressed. Further, upon application of the inner rear wheel braking force, a yawing moment is generated in the vehicle in the same direction as the turning direction of the vehicle. Thus, the desired turning locus tracing performance of the vehicle can be maintained satisfactorily.

As described above, the above-described inner rear wheel braking force is applied as a result of the absolute value |Gy| of the actual lateral acceleration being equal to or higher than the second reference value Gy2. However, when the absolute value |Gy| of the actual lateral acceleration still reaches the third reference value Gy3, the present apparatus generates a predetermined braking force (outer wheel braking force) corresponding to the absolute value |Gy| of the actual lateral acceleration in the front wheel (the front right wheel FR of FIG. 3) located on the radially outer side of the turning locus, as shown in FIG. 3(c).

The outer wheel braking force is set so as to increase from zero to an upper limit ff with a predetermined slope, as the absolute value |Gy| of the actual lateral acceleration increases from the third reference value Gy3, and then to remain at the upper limit ff even when the absolute value |Gy| of the actual lateral acceleration increases further. As a result of application of the outer wheel braking force, a yawing moment is forcibly generated in the direction opposite the turning direction of the vehicle. As a result, the absolute value |Gy| of the actual lateral acceleration decreases, whereby an increase in the roll angle of the vehicle body is suppressed.

As described above, in the case where the absolute value |Gy| of the actual lateral acceleration, which serves as the excessive rolling generation tendency index, becomes equal to or greater than the rollover prevention control starting reference value Gyth (=the first reference value Gy1), the present apparatus generates only the inner front wheel braking force in accordance with the absolute value |Gy| of the actual lateral acceleration in an early stage in which the absolute value |Gy| of the actual lateral acceleration is less than the second reference value Gy2; generates, in addition to the inner front wheel braking force, the inner rear wheel braking force in accordance with the absolute value |Gy| of the actual lateral acceleration in a subsequent stage in which the absolute value |Gy| of the actual lateral acceleration is equal to or greater than the second reference value Gy2 but not greater than the third reference value Gy3; and generates, in addition to the inner rear wheel braking force, the outer wheel braking force in accordance with the absolute value |Gy| of the actual lateral acceleration in a stage in which the absolute value |Gy| of the actual lateral acceleration is equal to or higher than the third reference value Gy3 (in this stage, the inner front wheel braking force is not generated).

In this manner, the present apparatus performs US suppression control, OS suppression control, and rollover prevention control (hereinafter collectively referred to as "turning stability control") to thereby apply predetermined braking forces to relevant wheels for ensuring the stability of the vehicle. Further, when any one of anti-skid control, front-rear braking force distribution control, and traction control described later is also required to be executed during execution of the turning stability control, the present apparatus finally determines the braking force to be applied to the wheels in consideration of braking forces to be applied to the wheels so as to perform any one of the above-mentioned controls. The above is the outline of the vehicle motion control.

Actual Operation

The actual operation of the vehicle motion control apparatus 10 according to the present invention having the above-described structure will be explained below while referring to FIGS. 4 to 9, which show flowcharts of routines which are executed by the CPU 61 of the electronic control apparatus 60. In the flowcharts, "" appended to the end of various variables, flags, or symbols collectively represents fl, fr, rl, and rr and indicates that the particular variable, flag, or symbol applies to all of the wheels of the vehicle. For example, the wheel speed Vw collectively indicates the front left wheel speed Vwfl, the front right wheel speed Vwfr, the rear left wheel speed Vwrl, and the rear right wheel speed Vwrr.

Figure 4:
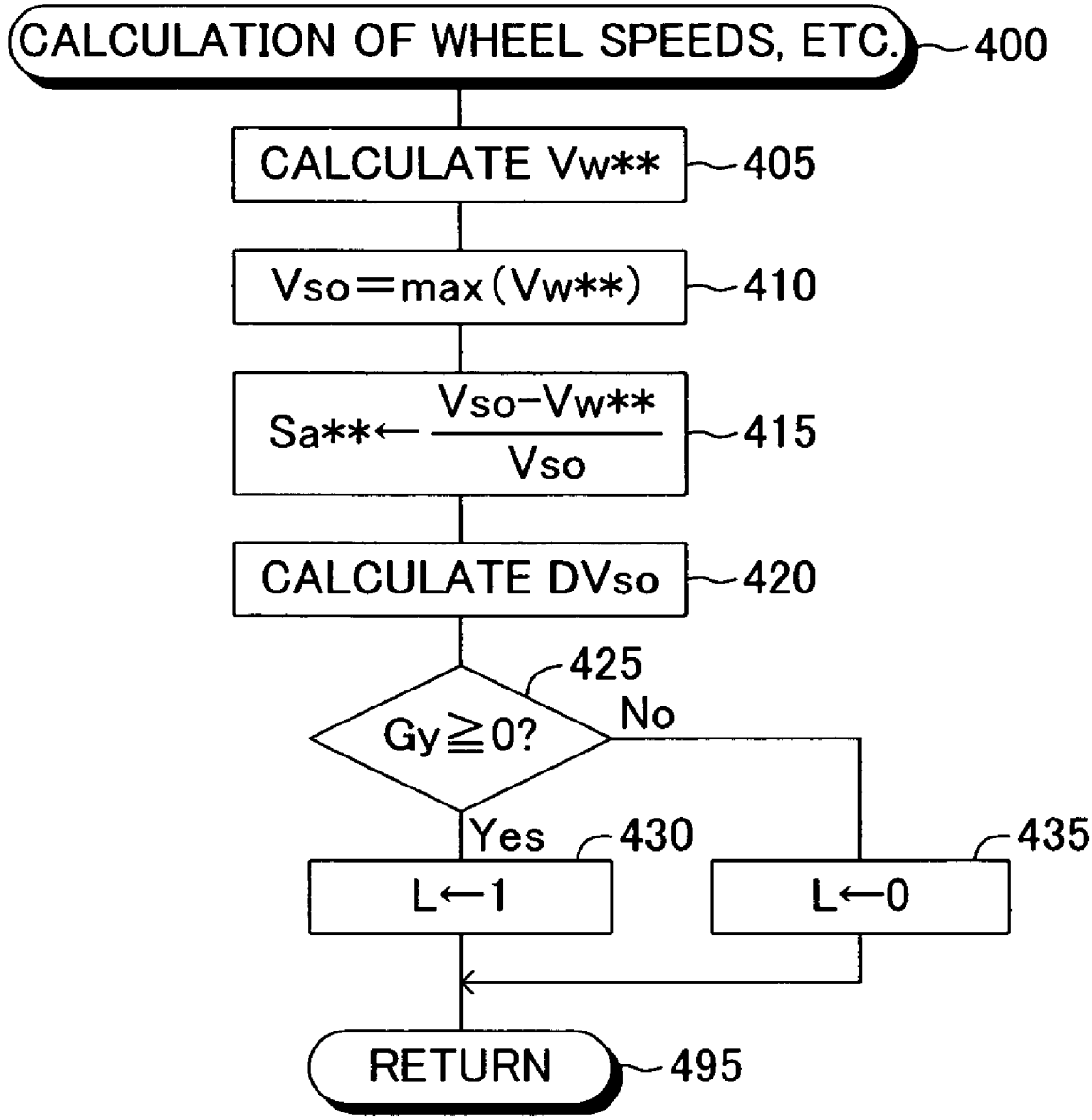
FIG. 4 is a flowchart showing a routine by which the CPU shown in FIG. 1 calculates wheel speeds and other parameters.

At prescribed time intervals, the CPU 61 repeatedly performs a routine shown in FIG. 4 for calculating the wheel speed Vw and other parameters. At a prescribed timing, the CPU 61 starts processing of the routine from Step 400. It proceeds to Step 405 and calculates the wheel speed (the speed of the outer periphery of a tire) Vw (m/s) for each wheel. Specifically, the CPU 61 calculates the wheel speed Vw of each wheel on the basis the frequency of a signal which each wheel speed sensor 51 outputs.

Next, the CPU 61 proceeds to Step 410 and sets the estimated vehicle-body speed Vso to the largest value of the wheel speed Vw. Alternatively, the estimated vehicle-body speed Vso may be set to the average value of the wheel speed Vw.

Next, the CPU 61 proceeds to Step 415 and calculates the actual slip rate Sa for each wheel on the basis the value of the estimated vehicle-body speed Vso calculated in Step 410, the value of the wheel speed Vw of each wheel calculated in Step 405, and the equation shown in the box of Step 415. As described below, the actual slip rate Sa** is used when calculating the braking force to be applied to each wheel.

Next, the CPU 61 proceeds to Step 420 and calculates an estimated vehicle-body acceleration DVso, which is the differential with respect to time of the estimated vehicle-body speed Vso, on the basis of the following Equation (3). In Equation (3), Vso1 is a previously estimated vehicle-body speed calculated in Step 410 during the previous execution of the present routine, while $\Delta t$ represents the above-described prescribed intervals, which correspond to the computation period of the present routine.

$$DVso=(Vso-Vso1)/\Delta t \quad (3)$$

Next, the CPU 61 proceeds to Step 425 and determines whether or not the value of the actual lateral acceleration Gy detected by means of the lateral acceleration sensor 54 is equal to or higher than zero. If the value of the actual lateral acceleration Gy is equal to or higher than zero, a determination of "Yes" is made in Step 425, so the CPU 61 proceeds to Step 430 and sets a turning direction indicating flag L to "1." The CPU 61 then proceeds to Step 495 and ends the current execution of the present routine. In the determination of Step 425, if the value of the actual lateral acceleration Gy is negative, a determination of "No" is made in Step 425, so the CPU 61 proceeds to Step 435 and sets the turning direction indicating flag L to "0." The CPU 61 then proceeds to Step 495 and ends the current execution of the present routine.

Here, the turning direction indicating flag L indicates that the vehicle is turning in the counterclockwise direction (as seen from the top of the vehicle) when its value is "1," while indicating that the vehicle is turning in the clockwise direction (as seen from the top of the vehicle) when its value is "0." Accordingly, the turning direction of the vehicle is specified by the value of the turning direction indicating flag L.

Next, calculation of the lateral acceleration deviation will be described. The CPU 61 repeatedly performs the routine shown in FIG. 5 at predetermined intervals. At a prescribed timing, the CPU 61 starts processing of the routine from Step 500. It proceeds to Step 505 and calculates the target lateral acceleration Gyt on the basis the value of the steering angle $\theta$s detected by means of the steering angle sensor 52, the value of the estimated vehicle-body speed Vso calculated in Step 410 of FIG. 4, and the equation shown in the box of Step 505, which corresponds to the right side of the above-described Equation (1).

Next, the CPU 61 proceeds to Step 510 and calculates the lateral acceleration deviation ΔGy on the basis the value of the target lateral acceleration Gyt calculated in Step 505, the value of the actual lateral acceleration Gy detected by means of the lateral acceleration sensor 54, and the equation shown in the box of Step 510, which corresponds to the right side of the above-described Equation (2). The CPU 61 then proceeds to Step 595 and ends the current execution of the present routine.

Next, there will be described calculation of the target slip rate for each wheel necessary for determining the braking force to be applied to each wheel when only the above-described OS-US suppression control is executed. The CPU 61 repeatedly executes the routine shown in FIG. 6 at prescribed intervals. At a prescribed timing, the CPU 61 begins processing of this routine from Step 600. It proceeds to Step 605 and determines whether or not the absolute value |Gy| of the actual lateral acceleration Gy detected by means of the lateral acceleration sensor 54 is smaller than the above-mentioned rollover prevention control starting reference value Gyth (=the first reference value Gy1). If a determination of "No" is made in Step 605, the CPU 61 immediately proceeds to Step 695 and ends the current execution of the present routine. This corresponds to the case where a higher priority is given to performing rollover prevention control.

Here, the description is continued under the assumption that the absolute value |Gy| of the actual lateral acceleration is smaller than the rollover prevention control starting reference value Gyth. In this case, the CPU 61 makes a "Yes" determination in Step 605, and proceeds to Step 610 so as to calculate a control quantity Gou corresponding to the magnitude of the yawing moment which should be generated in the vehicle by the OS-US suppression control, on the basis of the absolute value of the lateral acceleration deviation ΔGy calculated in Step 510 of FIG. 5 and the map shown in the box of Step 610.

As shown in the map described in the box of Step 610, the control quantity Gou is set to zero when the absolute value of the lateral acceleration deviation ΔGy is smaller than or equal to a value ΔGy1. The control quantity Gou is set so as to increase linearly from zero to an upper limit G1 as the absolute value of the lateral acceleration deviation ΔGy increases from the value ΔGy1 to a value ΔGy2 when the absolute value of the lateral acceleration deviation ΔGy is greater than or equal to the value ΔGy1 but not greater than the value ΔGy2. When the absolute value of the lateral acceleration deviation ΔGy is equal to or greater than the value ΔGy2, the control quantity Gou is maintained at the upper limit G1. In other words, the OS-US suppression control is not carried out when the absolute value of the lateral acceleration deviation ΔGy is smaller than the value ΔGy1, whereas when the absolute value of the lateral acceleration deviation ΔGy is equal to or greater than the value ΔGy1, the control quantity Gou is determined in accordance with the absolute value of the lateral acceleration deviation ΔGy and with reference to the map shown in the box of Step 610.

Figure 5:
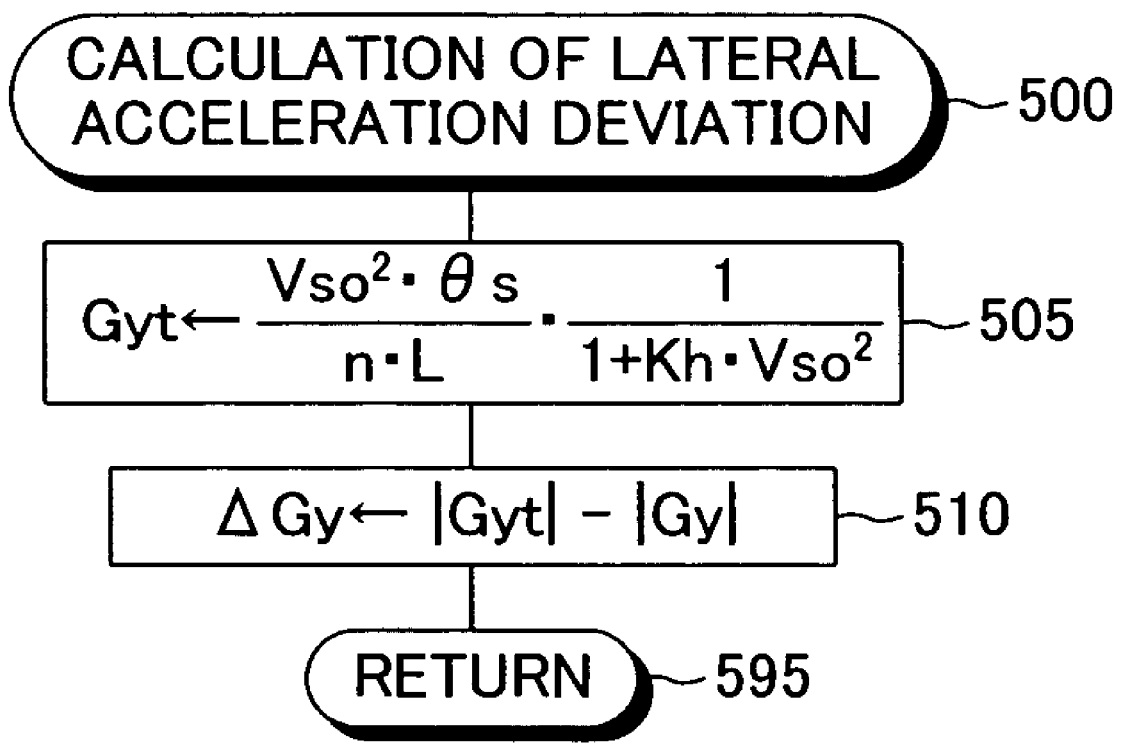
FIG. 5 is a flowchart showing a routine by which the CPU shown in FIG. 1 calculates a lateral acceleration deviation.

Next, the CPU 61 proceeds to Step 615 and determines whether or not the value of the lateral acceleration deviation ΔGy calculated in Step 510 of FIG. 5 is equal to or higher than zero. If the value of the lateral acceleration deviation ΔGy is equal to or higher than zero (in actuality, the value of the lateral acceleration deviation ΔGy is equal to or higher than ΔGy1), the CPU 61 determines as described above that the vehicle is in an understeering state, and it proceeds to Step 620 and subsequent steps for calculating the target slip rate for each wheel to be used when the above-described understeering suppression control is performed.

The CPU 61 proceeds to Step 620 so as to determine whether or not the value of the turning direction indicating flag L is "1." When a determination of "Yes" is made in Step 620 (that is, the vehicle is turning in the counterclockwise direction as seen from the top of the vehicle), the CPU 61 proceeds to Step 625, and sets the target slip rate Strl of the rear left wheel RL to a value obtained by multiplying a coefficient Kb by the control quantity Gou. The target slip rates Stfl, Stfr, and Strr of the remaining wheels FL, FR, and RR are all set to zero. The CPU 61 then proceeds to Step 695 and ends the current execution of the present routine. As a result, a target slip rate corresponding to the absolute value |ΔGy| of the lateral acceleration deviation ΔGy and generating a yawing moment in the same direction as the turning direction of the vehicle is set only for the rear left wheel RL, which is the rear wheel located on the radially inner side of a turning locus when the vehicle is turning in the counterclockwise direction as seen from the top of the vehicle.

When the turning direction indicating flag L is determined to be "0" in Step 620, the CPU 61 makes a "No" determination in Step 620 so as to proceed Step 630. In Step 630, the CPU 61 sets the target slip rate Strr of the rear right wheel RR to a value obtained by multiplying the coefficient Kb by the control quantity Gou. The target slip rates Stfl, Stfr, and Strl of the remaining wheels FL, FR, and RL are all set to zero. The CPU 61 then proceeds to Step 695 and ends the current execution of the present routine. As a result, a target slip rate corresponding to the absolute value |ΔGy| of the lateral acceleration deviation ΔGy and generating a yawing moment in the same direction as the turning direction of the vehicle is set only for the rear right wheel RR, which is the rear wheel located on the radially inner side of a turning locus when the vehicle is turning in the clockwise direction as seen from the top of the vehicle.

When the value of the lateral acceleration deviation ΔGy is determined to be negative (in actuality, the value of the lateral acceleration deviation ΔGy is equal to or smaller than —ΔGy1) in Step 615, the CPU 61 determines as described above that the vehicle is in an oversteering state, and it proceeds to Step 635 and subsequent steps for calculating the target slip rate for each wheel for carrying out the above-described oversteering suppression control.

Processing of the routine from Step 635 to Step 645 corresponds to the above-described processing of the routine from Step 620 to Step 630. When proceeding to Step 640 (that is, the vehicle is turning in the counterclockwise direction as seen from the top of the vehicle), the CPU 61 sets the target slip rate Sffr of the front right wheel FR to a value obtained by multiplying a coefficient Kf by the control quantity Gou. The target slip rates Stfl, Strl, and Strr of the remaining wheels FL, RL, and RR are all set to zero. The CPU 61 then proceeds to Step 695 and ends the current execution of the present routine. As a result, a target slip rate corresponding to the absolute value |ΔGy1| of the lateral acceleration deviation ΔGy and generating a yawing moment in the direction opposite the turning direction of the vehicle is set only for the front right wheel FR, which is the front wheel located on the radially outer side of a turning locus when the vehicle is turning in the counterclockwise direction as seen from the top of the vehicle.

Further, when proceeding to Step 645 (that is, the vehicle is turning in the clockwise direction as seen from the top of the vehicle), the CPU 61 sets the target slip rate Stfl of the front left wheel FL to a value obtained by multiplying the coefficient Kf by the control quantity Gou. The target slip rates Sftr, Strl, and Strr of the remaining wheels FR, RL, and RR are all set to zero. The CPU 61 then proceeds to Step 695 and ends the current execution of the present routine. As a result, a target slip rate corresponding to the absolute value |ΔGy| of the lateral acceleration deviation ΔGy and generating a yawing moment in the direction opposite the turning direction of the vehicle is set only for the front left wheel FL, which is the front wheel located on the radially outer side of a turning locus when the vehicle is turning in the clockwise direction as seen from the top of the vehicle. In this manner, the target slip rate for each wheel necessary for determining the braking force to be applied to each wheel when carrying out only the OS-US suppression control is determined.

Next, there is described calculation of the target slip rate for each wheel necessary for determining the braking force to be applied to each wheel when only the above-described rollover prevention control is executed. The CPU 61 repeatedly performs the routine shown in FIG. 7 at predetermined intervals. At a prescribed timing, the CPU 61 starts processing of the routine from Step 700. It proceeds to Step 705 and determines whether or not the absolute value |Gy| of the actual lateral acceleration Gy detected by means of the lateral acceleration sensor 54 is equal to or higher than the rollover prevention control starting reference value Gyth. If a determination of "No" is made in Step 705, the CPU 61 immediately proceeds to Step 795 and ends the current execution of the present routine. In this case, the above-described rollover prevention control is not performed (OS-US suppression control can be performed).

Here, the description is continued under the assumption that the absolute value |Gy| of the actual lateral acceleration Gy is equal to or higher than the rollover prevention control starting reference value Gyth. In this case, the CPU 61 makes a "Yes" determination in Step 705, and proceeds to Step 710. In Step 710, on the basis of the absolute value |Gy| of the lateral acceleration Gy detected by means of the lateral acceleration sensor 54 and with reference to the map shown in the box of Step 710 corresponding to the graphs shown in FIG. 3(*a*) to FIG. 3(*c*), the CPU 61 calculates a control quantity Gfi corresponding to the magnitude of the inner front wheel braking force, a control quantity Gri corresponding to the magnitude of inner rear wheel braking force, and a control quantity Gfo corresponding to the magnitude of outer wheel braking force, which forces must be generated in the vehicle by rollover prevention control.

As shown in the map described in the box of Step 710, the control quantity Gfi is set so as to increase from zero to a certain value with a predetermined slope, as the absolute value |Gy| of the actual lateral acceleration increases, when the absolute value |Gy| of the actual lateral acceleration lies in the range between the first reference value Gy1 and the second reference value Gy2, and decrease from the certain value to zero with a predetermined slope, as the absolute value |Gy| of the actual lateral acceleration increases, when the absolute value |Gy| of the actual lateral acceleration lies in the range between the second reference value Gy2 and the third reference value Gy3. The control quantity Gri is set so as to increase from zero to an upper limit G2 with a predetermined slope, as the absolute value |Gy| of the actual lateral acceleration increases from the second reference value Gy2, and remain at the upper limit G2 even when the absolute value |Gy| of the actual lateral acceleration increases further. The control quantity Gfo is set so as to increase from zero to an upper limit G3 with a predetermined slope as the absolute value |Gy| of the actual lateral acceleration increases from the third reference value Gy3, and remain at the upper limit G3 even when the absolute value |Gy| of the actual lateral acceleration increases further.

Next, the CPU 61 proceeds to Step 715 and determines whether or not the value of the turning direction indicating flag L is "1." When a determination of "Yes" is made in Step 715 (that is, the vehicle is turning in the counterclockwise direction as seen from the top of the vehicle), the CPU 61 proceeds to Step 720, and sets the target slip rate Stfl of the front left wheel FL to a value obtained by multiplying the coefficient Kf by the control quantity Gfi calculated in Step 710; the target slip rate Sffr of the front right wheel FR to a value obtained by multiplying the coefficient Kf by the control quantity Gfo calculated in Step 710; the target slip rate Strl of the rear left wheel RL to a value obtained by multiplying the coefficient Kr by the control quantity Gri; and the target slip rate Strr of the rear right wheel RR to zero. The CPU 61 then proceeds to Step 795 and ends the current execution of the present routine. As a result, when the vehicle is turning in the counterclockwise direction as seen from the top of the vehicle, a target slip rate corresponding to the inner front wheel braking force is set for the front left wheel FL, which corresponds to the front wheel located on the radially inner side of a turning locus; a target slip rate corresponding to the inner rear wheel braking force is set for the rear left wheel RL, which corresponds to the rear wheel located on the radially inner side of a turning locus; and a target slip rate corresponding to the outer wheel braking force is set for the front right wheel FR, which corresponds to the front wheel located on the radially outer side of a turning locus.

When the turning direction indicating flag L is determined to be "0" in Step 715, the CPU 61 makes a "No" determination in Step 715 so as to proceed Step 725. In Step 725, the CPU 61 sets the target slip rate Stfl of the front left wheel FL to a value obtained by multiplying the coefficient Kf by the control quantity Gfo calculated in Step 710; the target slip rate Stfr of the front right wheel FR to a value obtained by multiplying the coefficient Kf by the control quantity Gfi calculated in Step 710; the target slip rate Strr of the rear right wheel RR to a value obtained by multiplying the coefficient Kr by the control quantity Gri; and the target slip rate Strl of the rear left wheel RL to zero. The CPU 61 then proceeds to Step 795 and ends the current execution of the present routine. As a result, when the vehicle is turning in the clockwise direction as seen from the top of the vehicle, a target slip rate corresponding to the inner front wheel braking force is set for the front right wheel FR, which corresponds to the front wheel located on the radially inner side of a turning locus; a target slip rate corresponding to the inner rear wheel braking force is set for the rear right wheel RR, which corresponds to the rear wheel located on the radially inner side of a turning locus; and a target slip rate corresponding to the outer wheel braking force is set for the front left wheel FL, which corresponds to the front wheel located on the radially outer side of a turning locus. In this manner, the target slip rate for each wheel necessary for determining the braking force to be applied to each wheel when carrying out only rollover prevention control is determined.

Next, setting the control mode of the vehicle will be described. The CPU 61 repeatedly performs the routine shown in FIG. 8 at predetermined intervals. At a prescribed timing, the CPU 61 starts processing from Step 800. It proceeds to Step 805 and determines whether anti-skid control is necessary at the present time. Anti-skid control is control which decreases the braking force in a specified wheel when the specified wheel is locked when the brake pedal BP is being operated. The details of anti-skid control are well known, so an explanation of the details will be omitted here.

Specifically, in Step 805, when the brake switch 55 indicates that the brake pedal BP is being operated and the value of the actual slip rate Sa for a specified wheel calculated in Step 415 of FIG. 4 is equal to or higher than a prescribed positive value, the CPU 61** determines that anti-skid control is necessary.

When it is determined in Step 805 that anti-skid control is necessary, the CPU 61 proceeds to Step 810 and sets the value of a variable Mode to 1 to select a control mode for performing both turning stability control and anti-skid control. The CPU 61 then proceeds to Step 850.

When it is determined in Step 805 that anti-skid control is not necessary, the CPU 61 proceeds to Step 815 and determines whether front-rear braking force distribution control is necessary at the present time. Front-rear braking force distribution control is a form of control which decreases the ratio (the distribution) of the braking force for the rear wheels with respect to the braking force for the front wheels in accordance with the magnitude of the deceleration in the fore and aft direction of the vehicle during a state in which the brake pedal BP is being operated. The details of front-rear braking force distribution control are well known, so an explanation of the details thereof will be omitted here.

Specifically, in Step 815, when the brake switch 55 indicates that the brake pedal BP is being operated, the estimated vehicle-body acceleration DVso calculated in Step 420 of FIG. 4 is a negative value, and the absolute value of the estimated vehicle-body acceleration DVso is equal to or higher than a prescribed value, the CPU 61 determines that front-rear braking force distribution control is necessary.

If it is determined in Step 815 that front-rear braking force distribution control is necessary, the CPU 61 proceeds to Step 820, it sets the value of the variable Mode to 2 to select a control mode for performing both turning stability control and front-rear braking force distribution control, and then it proceeds to Step 850.

When it is determined in Step 815 that front-rear braking force distribution control is not necessary, the CPU 61 proceeds to Step 825 and determines whether traction control is necessary at the present time. Traction control is control which increases the braking force to a specified wheel or decreases the drive force of the engine 31 when spinning of a specified wheel occurs in the direction in which a drive force is generated by the engine 31 when the brake pedal BP is not being operated. The details of traction control are well known, so an explanation of the details thereof will be omitted here.

Specifically, in Step 825, when it is indicated by the brake switch 55 that the brake pedal BP is not being operated and when the actual slip rate Sa of a specified wheel calculated in Step 415 of FIG. 4 is a negative value and the absolute value of the actual slip rate Sa is equal to or higher than a prescribed value, the CPU 61 determines that traction control is necessary.

If it is determined in Step 825 that traction control is necessary, the CPU 61 proceeds to Step 830, it sets the value of the variable Mode to 3 to select a control mode for performing both turning stability control and traction control, and it proceeds to Step 850.

If it is determined in Step 825 that traction control is not necessary, the CPU 61 proceeds to Step 835 and determines whether the above-described turning stability control is necessary at the present time. Specifically, in Step 835, the CPU 61 determines that turning stability control is necessary in the following two cases, because a specific wheel whose target slip rate St set by the routine in FIG. 6 or FIG. 7** is not zero is present:

Case 1: the absolute value of the actual lateral acceleration Gy detected by means of the lateral acceleration sensor 54 is less than the rollover prevention control starting reference value Gyth and the absolute value of the lateral acceleration deviation ΔGy calculated in Step 510 of FIG. 5 is equal to or higher than the above-described ΔGy1 (that is, the OS-US suppression control is performed); and Case 2: the absolute value of the actual lateral acceleration Gy is equal to or higher than the rollover prevention control starting reference value Gyth (that is, the rollover prevention control is performed).

It is determined in Step 835 that the turning stability control is necessary, the CPU 61 proceeds to Step 840 so as to set the value of the variable Mode to 4 to thereby select a control mode for performing only the turning stability control (in actuality, either the OS-US suppression control or the rollover prevention control). Subsequently, the CPU 61 proceeds to Step 850. If it is determined in Step 835 that the turning stability control is not necessary, the CPU 61 proceeds to Step 845 so as to set the value of the variable Mode to zero to thereby select a non-control mode in which motion control for the vehicle is not carried out, and then proceeds to Step 850. In this case, a specified wheel which should be controlled does not exist.

When the CPU 61 proceeds to Step 850, it sets the flag CONT for the wheels to be controlled to "1," and it sets the flag CONT for the uncontrolled wheels which are not controlled to "0." The wheels to be controlled in Step 850 are wheels for which it is necessary to control at least one of the pressure increasing valves PU and the pressure reducing valves PD shown in FIG. 2.

Figure 6:
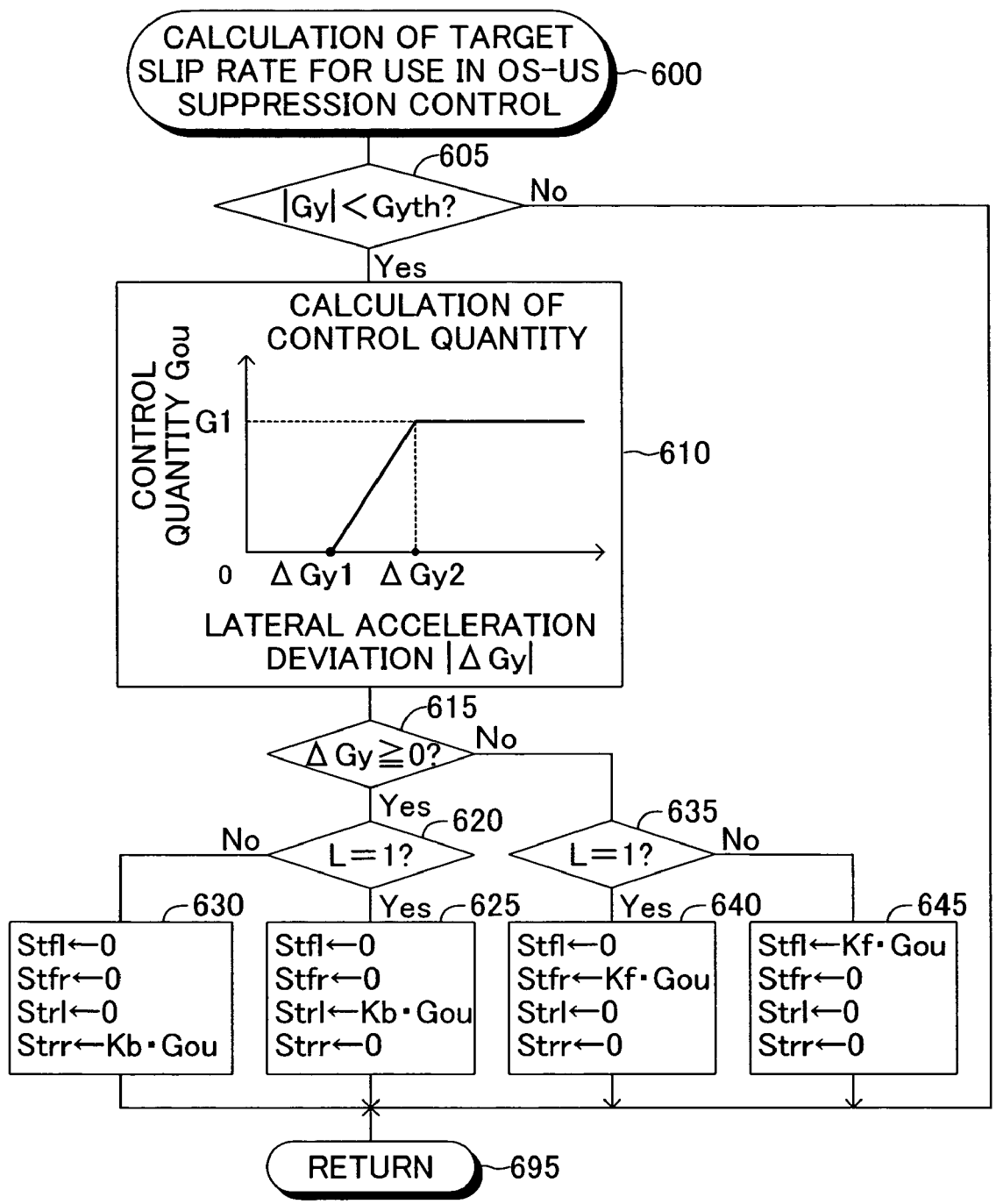
FIG. 6 is a flowchart showing a routine by which the CPU shown in FIG. 1 calculates a target slip rate during OS-US suppression control.

Accordingly, when, for example, the brake pedal BP is not being operated and Step 640 of FIG. 6 is proceeded to, it is necessary to increase only the brake hydraulic pressure of the wheel cylinder Wfr for the front right wheel FR. Therefore, by switching each of the control valve SA1, the switching valve STR, and the pressure increasing valve PUfl shown in FIG. 2 to its second position and controlling each of the pressure increasing valve PUfr and the pressure reducing valve PDfr, the brake hydraulic pressure only in the wheel cylinder Wfr is increased by utilizing the high pressure generated by the high pressure generating portion 41, while the brake hydraulic pressure in the wheel cylinder Wfl at that time is maintained. Accordingly, in this case, the wheels to be controlled include not only the front right wheel FR but also the front left wheel FL. After the CPU 61 executes Step 850, it proceeds to Step 895 and ends the current execution of the present routine. In this manner, the control mode is specified, and the wheels to be controlled are also specified.

Next, control of the braking force applied to each wheel will be described. The CPU 61 repeatedly executes the routine shown in FIG. 9 at prescribed intervals. At a prescribed timing, the CPU 61 starts processing from Step 900, and it proceeds to Step 905 to determine whether the value of the variable Mode is 0. If the value of the variable Mode is 0, the CPU 61 makes a determination of "No" in Step 905 and proceeds to Step 910, in which it sets all of the solenoid valves in the brake hydraulic pressure controller 40 to OFF (a non-energized state) because it is not necessary to perform brake control with respect to any wheel. The CPU 61 then proceeds to Step 995 and ends the current execution of the present routine. As a result, a brake hydraulic pressure corresponding to the operating force applied to the brake pedal BP by the driver is supplied to each wheel cylinder W**.

On the other hand, if it is determined in Step 905 that the value of the variable Mode is not 0, the CPU 61 makes a determination of "Yes" in Step 905 and proceeds to Step 915, where it determines whether the value of the variable Mode is 4. If the value of the variable Mode is not 4 (namely, if anti-skid control or other type of control other than turning stability control is necessary), the CPU 61 makes a determination of "No" in Step 915 and proceeds to Step 920. In Step 920, for each wheel for which the value of the flag CONT was set to "1" in Step 850 of FIG. 8, the CPU 61 corrects the value of the target slip rate St which was set in FIG. 6 or FIG. 7 and which is necessary when only the turning stability control is performed. The CPU 61 then proceeds to Step 925. As a result, the value of the slip rate St which was already set in FIG. 6 or FIG. 7** is corrected for each of the wheels to be controlled by an amount corresponding to the target slip rate of each wheel, which target slip rate becomes necessary when control of a type corresponding to the value of the variable Mode is performed in addition to the turning stability control.

Figure 7:
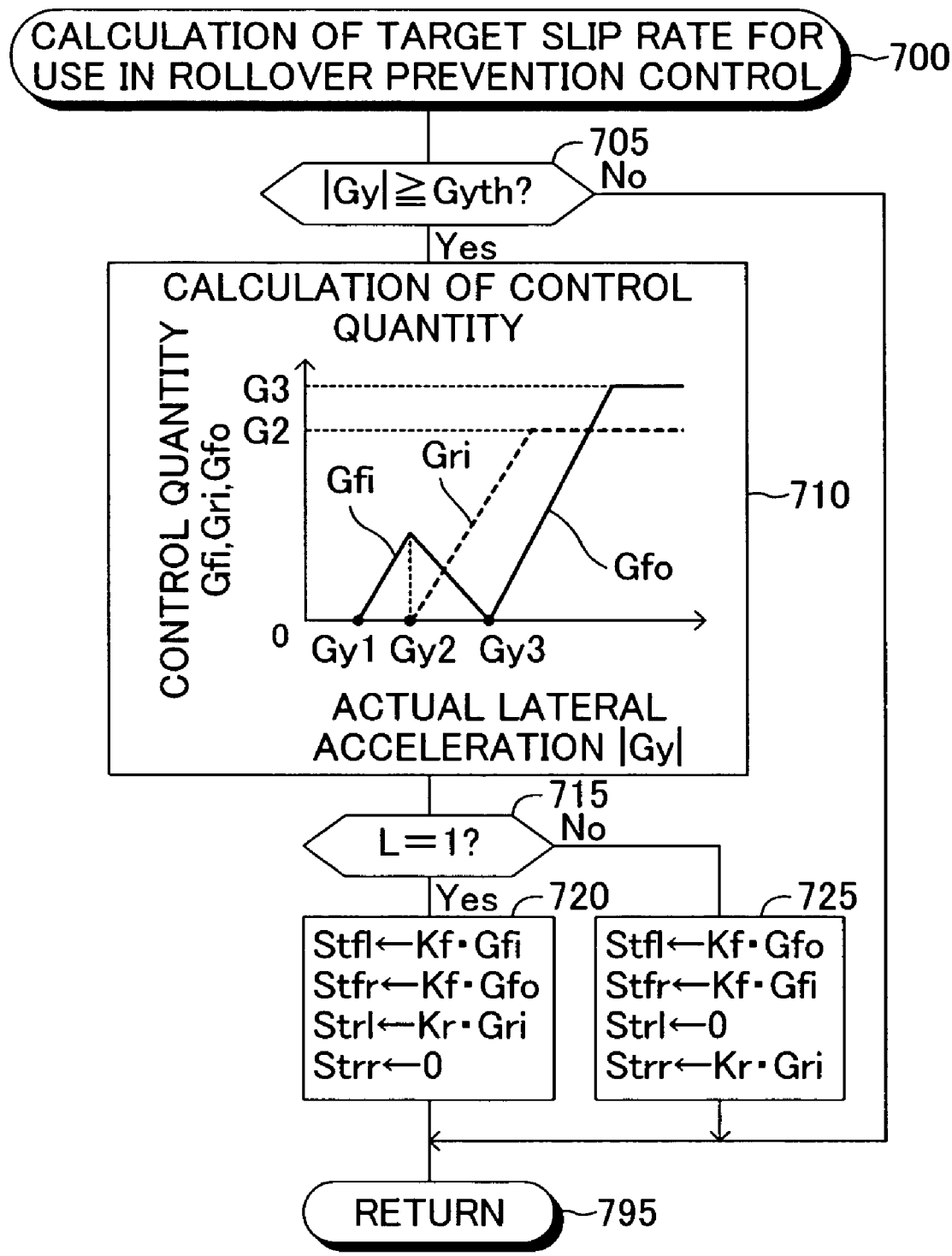
FIG. 7 is a flowchart showing a routine by which the CPU shown in FIG. 1 calculates a target slip rate during rollover prevention control.

When the value of the variable Mode is determined to be 4 in Step 915, the CPU 61 makes a determination of "Yes" in Step 915, and as it is not necessary to correct the target slip rate St for each wheel which was already set in FIG. 6 or FIG. 7, the CPU 61 proceeds directly to Step 925. In Step 925, the CPU 61 calculates the slip rate deviation ΔSt for the wheels to be controlled for which the flag CONT was set to "1" in Step 850 of FIG. 8, on the basis the value of the target slip rate St, the value of the actual slip rate Sa calculated in Step 415 of FIG. 4, and the equation shown in the box of Step 925**.

The CPU 61 then proceeds to Step 930 and sets the hydraulic pressure control mode for each wheel to be controlled, i.e., for each wheel for which CONT=1. Specifically, on the basis the value of the slip rate deviation ΔSt for each wheel to be controlled which was calculated in Step 925 and the map shown in the box of Step 930, the CPU 61 sets the hydraulic pressure control mode to "increase pressure" for each wheel to be controlled when the value of the slip rate deviation ΔSt exceeds a prescribed positive reference value, it sets the hydraulic pressure control mode to "maintain" when the value of the slip rate deviation ΔSt is greater than or equal to a prescribed negative reference value and at most the above-described positive reference value, and it sets the hydraulic pressure control mode to "decrease pressure" when the value of the slip rate deviation ΔSt** falls below the above-described prescribed negative reference value.

The CPU 61 then proceeds to Step 935, and on the basis the hydraulic pressure control mode for each wheel to be controlled which was set in Step 930, it controls the control valves SA1, SA2 and the switching valve STR shown in FIG. 2, and it controls the pressure increasing valves PU and the pressure reducing valves PD in accordance with the hydraulic pressure control mode for each wheel to be controlled.

Specifically, the CPU 61 controls the pressure increasing valve PU and the pressure reducing valve PD to its first position (the position of a nonenergized state) for each wheel for which the hydraulic pressure mode is "increase pressure," it controls the pressure increasing valve PU to its second position (the position of an energized state) and it controls the pressure reducing valve PD to its first position for each wheel for which the hydraulic pressure control mode is "maintain," and it controls both the pressure increasing valve PU and the pressure reducing valve PD to its second position (the position of an energized state) for each wheel for which the hydraulic pressure control mode is "decrease pressure."

As a result, the brake hydraulic pressure in the wheel cylinders W of the wheels to be controlled for which the hydraulic pressure control mode is "increase pressure" increases, and the brake hydraulic pressure in the wheel cylinders W of the wheels to be controlled for which the hydraulic pressure control mode is "decrease pressure" decreases, and the actual slip rate Sa of each controlled wheel is controlled so as to approach the target slip rate St. As a result, control corresponding to the control mode set in FIG. 8 is achieved.

Figure 8:
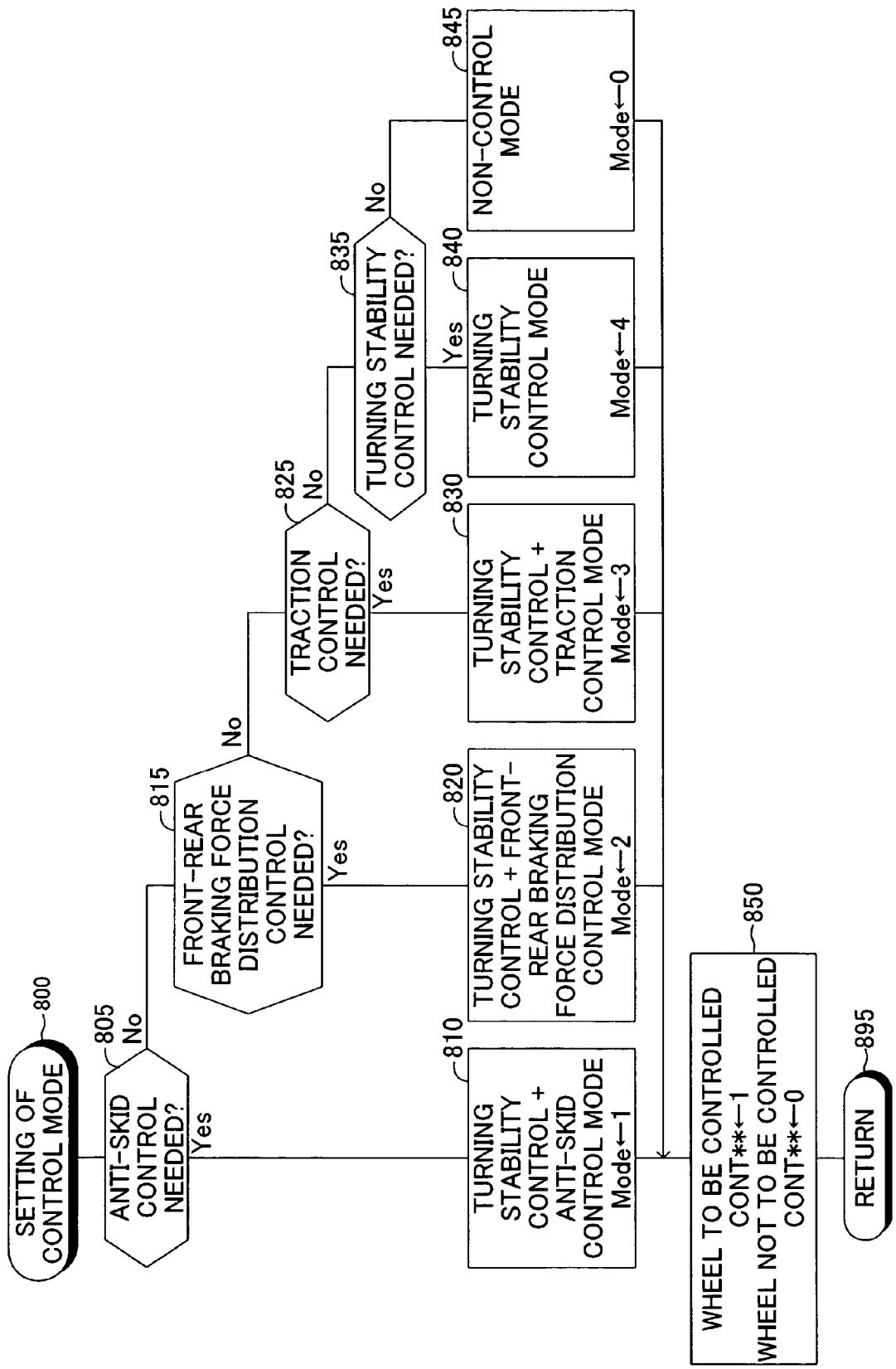
FIG. 8 is a flowchart showing a routine by which the CPU shown in FIG. 1 sets the control mode.
Figure 9:
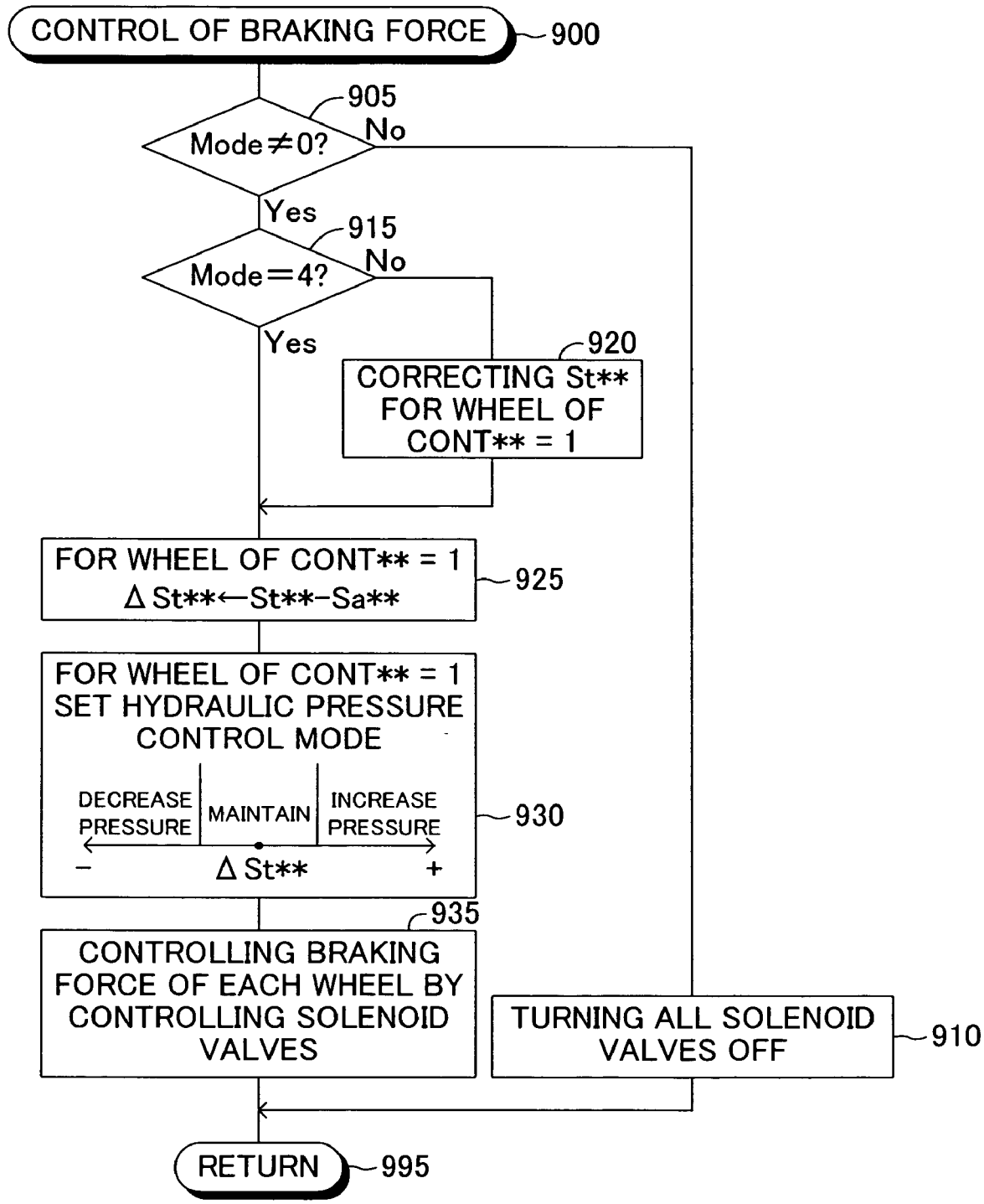
FIG. 9 is a flowchart showing a routine by which the CPU shown in FIG. 1 controls the braking force applied to each wheel of the vehicle.

When the control mode which is set by performing the routine of FIG. 8 is the control mode for performing traction control (the value of the variable Mode=3) or the control mode for performing only turning stability control (the value of the variable Mode=4), in order to decrease the drive force of the engine 31, if necessary, the CPU 61 controls the throttle valve actuator 32 so that the opening of the throttle valve TH is a smaller opening by a prescribed amount than an opening corresponding to the operation amount Accp of the accelerator pedal AP. Then, the CPU 61 proceeds to Step 995 and ends the current execution of the present routine.

As described above, in the motion control apparatus for a vehicle according to the present invention, in the case where the absolute value |Gy| of the actual lateral acceleration Gy becomes equal to or greater than the first reference value Gy1 in the above-described rollover prevention control, the inner front wheel braking force corresponding to the absolute value |Gy| of the actual lateral acceleration is generated only in the front wheel located on the radially inner side of the turning locus in a relatively early stage where the absolute value |Gy| of the actual lateral acceleration is less than the second reference value Gy2. Upon application of the inner front wheel braking force, the above-described vehicle height reducing force is generated at the front portion of the vehicle body located on the radially inner side of the turning locus. Therefore, an increase in the roll angle of the vehicle body is suppressed. In addition, since the inner front wheel braking force acts on the front wheel whose load increases in a deceleration state, a yawing moment is generated efficiently in the vehicle in the same direction as the turning direction of the vehicle. Thus, the desired turning locus tracing performance of the vehicle can be maintained satisfactorily. Moreover, when the inner front wheel braking force is applied in a driven state, due to the action of the differential gear 35, a yawing moment is generated more effectively in the same direction as the turning direction of the vehicle. As a result, the turning and tracing ability can be maintained more satisfactorily.

Further, in addition to the inner front wheel braking force, the inner rear wheel braking force corresponding to the absolute value |Gy| of the actual lateral acceleration is generated in the rear wheel located on the radially inner side of the turning locus in a stage where the absolute value |Gy| of the actual lateral acceleration is equal to or higher than the second reference value Gy2 but less than the third reference value Gy3. The inner rear wheel braking force generates the above-described vehicle height reducing force in the rear portion of the vehicle body located on the radially inner side of the turning locus. Therefore, an increase in the roll angle of the vehicle body is suppressed. Further, upon application of the inner rear wheel braking force, a yawing moment is generated in the vehicle in the same direction as the turning direction of the vehicle. Therefore, the turning and tracing ability of the vehicle can be maintained satisfactorily.

Moreover, in addition to the inner rear wheel braking force, the outer wheel braking force corresponding to the absolute value |Gy| of the actual lateral acceleration is generated in the front wheel located on the radially outer side of the turning locus in a stage where the absolute value |Gy| of the actual lateral acceleration is equal to or higher than the third reference value Gy3. Upon application of the outer wheel braking force, a yawing moment in the direction opposite the turning direction of the vehicle is forcibly generated. As a result, the absolute value |Gy| of the actual lateral acceleration is decreased, whereby an increase in the roll angle of the vehicle body is suppressed.

Further, when the absolute value |Gy| of the actual lateral acceleration Gy becomes at least the first reference value Gy1, the inner front wheel braking force is first generated only in the front wheel (that is, in the single wheel) located on the radially inner side of the turning locus. Accordingly, the deceleration that the driver senses at this stage is relatively small. As a result, setting the first reference value Gy1 to a small value allows rollover prevention control to be started in an early stage where the absolute value |Gy| of the actual lateral acceleration Gy is small (accordingly, the roll angle is small).

As described above, in a process in which the absolute value |Gy| of the actual lateral acceleration Gy increases, the outer wheel braking force is applied after the inner front wheel braking force and the inner rear wheel braking force are applied. Accordingly, the outer wheel braking force is applied while an increase in the height of a portion of the vehicle body located on the radially inner side of the turning locus is suppressed, whereby the occurrence of excessive roll angle can be prevented more reliably.

The present invention is not limited to the above-described embodiment, and various modifications can be made within the scope of the present invention. For example, in the above-described embodiment the slip rate of each wheel is used as a control target for controlling the braking force applied to each wheel of the vehicle. However, any physical quantity, such as brake hydraulic pressure in the wheel cylinder W** of each wheel, may be used as a control target, so long as the physical quantity changes according to the braking force applied to each wheel.

In the above-described embodiment, the inner front wheel braking force is set so as to increase from zero to a certain value with a predetermined slope, as the absolute value |Gy| of the actual lateral acceleration increases, when the absolute value |Gy| of the actual lateral acceleration lies in the range between the first reference value Gy1 and the second reference value Gy2, and to decrease from the certain value to zero with a predetermined slope, as the absolute value |Gy| of the actual lateral acceleration increases, when the absolute value |Gy| of the actual lateral acceleration lies in the range between the second reference value Gy2 and the third reference value Gy3. However, when the absolute value |Gy| of the actual lateral acceleration is equal to or higher than the second reference value Gy2, the rate at which the inner front wheel braking force decreases with an increase in the absolute value |Gy| of the actual lateral acceleration may be changed. Specifically, the absolute value |Gy| of the actual lateral acceleration corresponding to a point where the decreasing inner front wheel braking force becomes zero may differ from the third reference value Gy3. Further, when the absolute value |Gy| of the actual lateral acceleration is equal to or higher than the second reference value Gy2, the inner front wheel braking force may be increased further from the certain value in accordance with an increase in the absolute value |Gy| of the actual lateral acceleration.

In the above-described embodiment, the upper limit G1 of the control quantity Gou calculated in Step 610 of FIG. 6 is made different from the upper limit G3 of the control quantity Gfo calculated in Step 710 of FIG. 7. However, the upper limit G1 of the control quantity Gou may be equal to the upper limit G3 of the control quantity Gfo.

In the above-described embodiment, a braking force, serving as the outer wheel braking force, is applied only to the front wheel located on the radially outer side of a turning locus. However, the braking force, serving as the outer wheel braking force, may be applied to the front and rear wheels located on the radially outer side of a turning locus.

Moreover, in the above-described embodiment, as shown in Step 710 of FIG. 7, the control quantities Gfi, Gri, and Gfo used in the rollover prevention control are determined in accordance with the absolute value |Gy| of the actual lateral acceleration Gy (excessive rolling generation tendency index) indicated by the output of the lateral acceleration sensor 54. However, the control quantities Gfi, Gri, and Gfo used in the rollover prevention control may be determined in accordance with the absolute value of the roll angle θroll of the vehicle, which serves as the excessive rolling generation tendency index.

Figure 10:
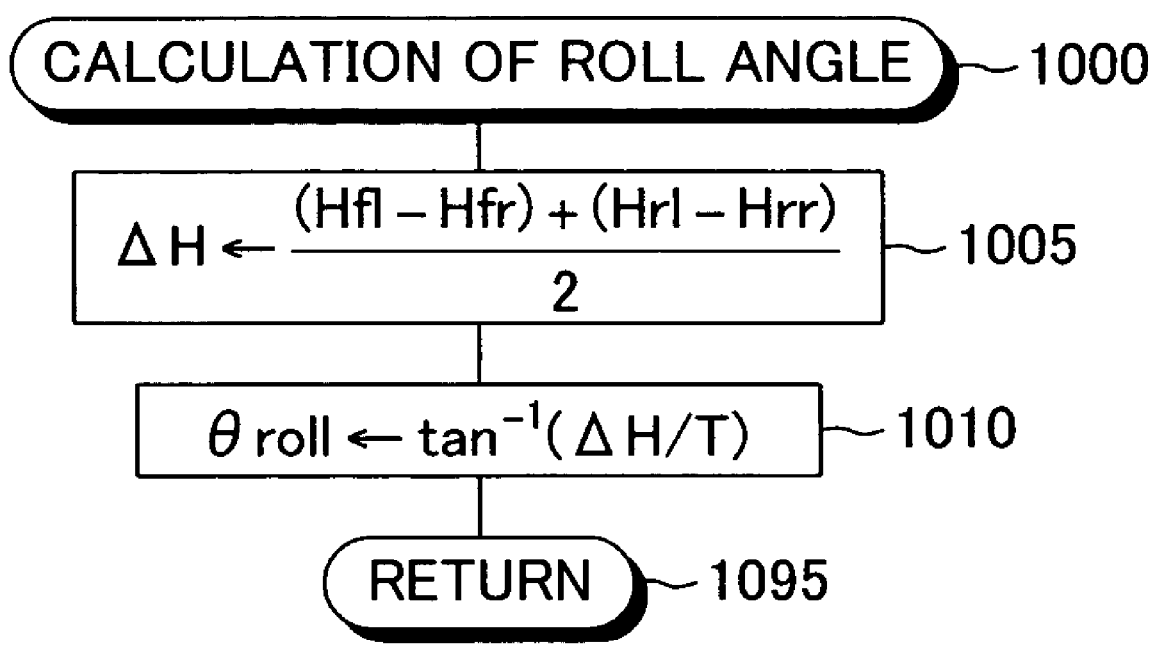
FIG. 10 is a flowchart showing a routine by which the CPU of a motion control apparatus for a vehicle according to a modification of the embodiment shown in FIG. 1 calculates a roll angle.

More specifically, at prescribed time intervals, the CPU 61 repeatedly performs a routine shown in FIG. 10 for calculating the roll angle θroll of the vehicle. Accordingly, at a prescribed timing, the CPU 61 starts processing of the routine from Step 1000. It proceeds to Step 1005 and calculates a vehicle height difference ΔH between the vehicle body left-side portion and the vehicle body right-side portion on the basis the vehicle heights Hfl, Hfr, Hrl, and Hrr at the wheel portions obtained from the vehicle height sensors 56fl, 56fr, 56rl, and 56rr, and the equation shown in the box of Step 1005.

Here, the vehicle height difference ΔH represents an average of the vehicle height difference between the vehicle body front-left portion and the vehicle body front-right portion and the vehicle height difference between the vehicle body rear-left portion and the vehicle body rear-right portion. The vehicle height difference ΔH becomes positive when the vehicle height at the vehicle body left-side portion is higher than the vehicle height at the vehicle body right-side portion; that is, when the vehicle is turning in the counterclockwise direction (as seen from the top of the vehicle), and becomes negative when the vehicle height at the vehicle body left-side portion is lower than the vehicle height at the vehicle body right-side portion; that is, when the vehicle is turning in the clockwise direction (as seen from the top of the vehicle).

Next, the CPU 61 proceeds to Step 1010 and calculates the roll angle θroll of the vehicle body on the basis of the value of the vehicle height difference ΔH calculated in Step 1005, the value of a wheel tread T, which is the lateral distance between the center of the contract surface between the tire tread of a left wheel (for example, the rear left wheel RL) and the road surface and that of a right wheel (for example, the rear right wheel RR), and the equation shown in the box of Step 1010. The CPU 61 then proceeds to Step 1095 and ends the current execution of the present routine. Here, as is apparent from the equation shown in the box of Step 1010, the sign of the roll angle θroll is the same as the sign of the vehicle height difference ΔH, whereby the roll angle θroll becomes positive when the vehicle is turning in the counterclockwise direction (as seen from the top of the vehicle), while becoming negative when the vehicle is turning in the clockwise direction (as seen from the top of the vehicle).

The CPU 61 calculates the control quantities Gfi, Gri, and Gfo with reference to a map which is similar to the map shown in the box of Step 710 of FIG. 7 but in which the horizontal axis is the absolute value of the roll angel θroll calculated in Step 1010 of FIG. 10 rather than the absolute value |Gy| of the actual lateral acceleration Gy. That is, the CPU 61 calculates the control quantities Gfi, Gri, and Gfo with reference to the modified map and by use of first, second, and third reference values θroll1, θroll2, and θroll3, instead of the first, second, and third reference values Gy1, Gy2, and Gy3. As described above, the control quantities Gfi, Gri, and Gfo (accordingly, the inner front wheel braking force, the inner rear wheel braking force, and the outer wheel braking force) used in the rollover prevention control are changed in accordance with the absolute value of the roll angel θroll of the vehicle. Further, the present apparatus may be modified to use, as the excessive rolling generation tendency index, roll angle speed θ'roll, which is the differential with respect to time of the above-calculated roll angle θ'roll, and to determine, in accordance with the absolute value of the roll angle speed θ'roll, the control quantities Gfi, Gri, and Gfo calculated in Step 710 of FIG. 7 for use in the rollover prevention control.

The control quantities Gfi, Gri, and Gfo calculated in Step 710 of FIG. 7 may be changed in accordance with the absolute value of the actual yaw rate of the vehicle, detected by means of the unillustrated yaw rate sensor and serving as the excessive rolling generation tendency index. The control quantities Gfi, Gri, and Gfo calculated in Step 710 of FIG. 7 may be changed in accordance with the steering angle θs (steering-wheel operation amount), which is obtained from the steering angle sensor 52 and serves as the excessive rolling generation tendency index. The control quantities Gfi, Gri, and Gfo calculated in Step 710 of FIG. 7 may be changed in accordance with the absolute value of the rotational speed of the steering wheel 21 (the speed at which the steering wheel is operated), which serves as the excessive rolling generation tendency index. In this case, the rotational speed θ's of the steering wheel can be calculated in accordance with the following Equation (4).

$$θ's=(θs−θs1)/Δt \quad (4)$$

In Equation (4), θs1 is a previous steering angle obtained from the steering angle sensor 52 during the previous execution of Step 505 of FIG. 5; and Δt represents the above-described predetermined time interval, which corresponds to the computation period of each routine.

Moreover, the "excessive rolling generation tendency index" may be the total sum of values (weighted values) obtained by multiplying by respective, predetermined coefficients the absolute value of the actual lateral acceleration Gy, the absolute value of the actual yaw rate, the absolute value of the roll angle θroll, the absolute value of the roll angle speed θ'roll, the absolute value of the steering angle θs, and the absolute value of the steering-wheel rotational speed θ's. Further, one of these absolute values that exceeds a reference value corresponding to the above-described rollover prevention control starting reference value Gyth (if a plurality of values exceed the corresponding reference values, the value having the greatest degree of deviation from the corresponding reference value) may be employed as the "excessive rolling generation tendency index."

What is claimed is:

1. A motion control apparatus for a vehicle comprising:
   determination means for determining whether or not the vehicle is in a turning state;
   obtaining means for obtaining an index value indicating a degree of a tendency of the vehicle to roll excessively; and
   first control means for applying a first braking force only to a front wheel at an inner side of a turning direction when the vehicle is in a turning state and the index value is equal to or greater than a predetermined first value.

2. A motion control apparatus for a vehicle according to claim 1, wherein the first control means changes the first braking force in accordance with the index value.

3. A motion control apparatus for a vehicle according to claim 1, wherein the front wheel is a driven wheel of the vehicle.

4. A motion control apparatus for a vehicle according to claim 1, further comprising second control means for applying a second braking force to a rear wheel at an inner side of a turning direction when the vehicle is in a turning state and the index value is equal to or greater than a predetermined second value greater than the predetermined first value.

5. A motion control apparatus for a vehicle according to claim 4, wherein the second control means changes the second braking force in accordance with the index value.

6. A motion control apparatus for a vehicle according to claim 4, further comprising third control means for applying a third braking force to at least one of wheels at an outer side of a turning direction when the vehicle is in a turning state and the index value is equal to or greater than a predetermined third value greater than the predetermined first value.

7. A motion control apparatus for a vehicle according to claim 6, wherein the predetermined third value is greater than the predetermined second value.

8. A motion control apparatus for a vehicle according to claim 6, wherein the third control means applies the third braking force to a front wheel at the outer side of the turning direction.

9. A motion control apparatus for a vehicle according to claim 6, wherein the third control means changes the third braking force in accordance with the index value.

10. A motion control apparatus for a vehicle according to claim 7, wherein the first control means sets the first braking force so that the first braking force decreases as the index value increases when the index value lies in the range between the second value and the third value.

11. A motion control apparatus for a vehicle according to claim 1, wherein the obtaining means obtains, as the index value, a value based on at least one of lateral acceleration, which is a component, in the lateral direction of the vehicle body, of acceleration acting on the vehicle; yaw rate acting on the vehicle; roll angle of the vehicle; roll angle speed, which is the rate of change of the roll angle with time; operation amount of a steering wheel which changes the steering angle of steerable wheels of the vehicle; and operation speed of the steering wheel.

* * * * *